(12) United States Patent
Honda et al.

(10) Patent No.: US 10,023,694 B2
(45) Date of Patent: Jul. 17, 2018

(54) ACTIVE-ENERGY-RAY-CURABLE RESIN, AND GAS BARRIER LAMINATE COMPRISING CURED PRODUCT OF SAID RESIN

(71) Applicant: MITSUBISHI GAS CHEMICAL COMPANY, INC., Tokyo (JP)

(72) Inventors: Eiichi Honda, Kanagawa (JP); Kazuki Kouno, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 327 days.

(21) Appl. No.: 14/773,063

(22) PCT Filed: Mar. 25, 2014

(86) PCT No.: PCT/JP2014/058203
§ 371 (c)(1),
(2) Date: Sep. 4, 2015

(87) PCT Pub. No.: WO2014/157151
PCT Pub. Date: Oct. 2, 2014

(65) Prior Publication Data
US 2016/0017095 A1    Jan. 21, 2016

(30) Foreign Application Priority Data

| | | |
|---|---|---|
| Mar. 26, 2013 | (JP) | 2013-064421 |
| Dec. 12, 2013 | (JP) | 2013-257184 |
| Jan. 7, 2014 | (JP) | 2014-001090 |
| Jan. 20, 2014 | (JP) | 2014-007737 |
| Jan. 29, 2014 | (JP) | 2014-014355 |

(51) Int. Cl.
| | |
|---|---|
| *C08G 69/26* | (2006.01) |
| *B23B 27/10* | (2006.01) |
| *C09D 177/06* | (2006.01) |
| *B32B 27/32* | (2006.01) |
| *C09D 179/02* | (2006.01) |
| *C08G 73/02* | (2006.01) |
| *C09J 179/02* | (2006.01) |

(Continued)

(52) U.S. Cl.
CPC ........... *C08G 69/26* (2013.01); *B32B 15/08* (2013.01); *B32B 15/20* (2013.01); *B32B 27/10* (2013.01);
(Continued)

(58) Field of Classification Search
CPC ...... C08G 69/26; C08G 73/028; B32B 27/36; B32B 27/32; B32B 27/34; B32B 27/10; B32B 15/20; B32B 15/08; C09D 177/06; C09D 179/02; C09J 179/02
USPC .... 428/220, 336, 402, 142, 195.1, 209, 212, 428/219, 29, 337, 349, 355 EP, 36.4, 391, 428/40.9, 414, 418, 421, 423.1, 425.5, 428/425.8, 429, 447, 457; 252/609, 606, 252/607, 182.29, 189, 400.24, 403, 601, 252/608, 500, 586, 182.2, 183.11, 183.12, 252/184, 301.35, 301.36, 301.4 R, 252/301.6 S, 392, 397, 400.31, 401, 511, 252/587; 156/247, 275.5, 281, 327, 329, 156/331.7, 332; 106/18.32, 287.13, 31.6, 106/31.65, 31.77, 31.78, 31.86, 481; 528/64, 68, 65, 28, 71, 76, 85, 60, 332, 528/59, 70, 74.5, 196, 271, 288, 329.1, 528/335, 342, 346, 347, 422, 423, 44, 72,
(Continued)

(56) References Cited

U.S. PATENT DOCUMENTS 6,479,588 B1 * 11/2002 Lu .................. C08F 283/04
525/181
2002/0016411 A1    2/2002 Ando et al.
(Continued)

FOREIGN PATENT DOCUMENTS

| | | |
|---|---|---|
| CN | 101096411 | 1/2008 |
| CN | 101679611 | 3/2010 |

(Continued)

OTHER PUBLICATIONS

Search Report issued in PCT/JP2014/058203 Patent Application No. , dated Jun. 10, 2014.

*Primary Examiner* — Gerald Higgins
*Assistant Examiner* — Kevin C Ortman, Jr.
(74) *Attorney, Agent, or Firm* — Greenblum & Bernstein, P.L.C.

(57) ABSTRACT

A resin according to the present invention is prepared by reacting a reaction product, which is obtained by Michael addition reaction between the following component (A) and the following component (B) and a subsequent amide group formation reaction, with the following component (C):
(A) an aliphatic diamine having 2 to 8 carbon atoms or a diamine having a $C_{6-8}$ aromatic ring;
(B) an unsaturated carboxylic acid represented by formula (2) and/or a derivative thereof, provided that the following component (C) is excluded:

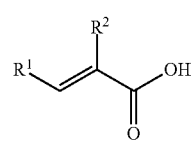

(2)

[in formula (2), $R^1$ and $R^2$ independently represent a hydrogen atom, an alkyl group having 1 to 8 carbon atoms, an aralkyl group having 1 to 8 carbon atoms or an aryl group]; and
(C) a (meth)acrylic acid-type compound having at least one glycidyl or isocyanate group.

20 Claims, No Drawings

(51) Int. Cl.
  *B32B 15/08* (2006.01)
  *B32B 15/20* (2006.01)
  *B32B 27/10* (2006.01)
  *B32B 27/34* (2006.01)
  *B32B 27/36* (2006.01)

(52) U.S. Cl.
  CPC .............. *B32B 27/32* (2013.01); *B32B 27/34* (2013.01); *B32B 27/36* (2013.01); *C08G 73/028* (2013.01); *C09D 177/06* (2013.01); *C09D 179/02* (2013.01); *C09J 179/02* (2013.01); *B32B 2255/20* (2013.01); *B32B 2307/7242* (2013.01); *B32B 2439/00* (2013.01)

(58) Field of Classification Search
  USPC ..... 528/73, 192, 193, 194, 195, 198, 25, 26, 528/287, 29, 290, 295, 302, 310, 32, 324, 528/326, 339.3, 345, 370, 399, 401, 45, 528/48, 482, 49, 57, 58, 62, 67, 75, 80, 528/81, 84
  See application file for complete search history.

(56) References Cited

U.S. PATENT DOCUMENTS

2003/0153722 A1* 8/2003 Gu .................... C08G 73/0286 528/310
2005/0014908 A1* 1/2005 Kutsuna .................... B32B 7/12 525/523
2005/0032928 A1 2/2005 Koyama
2005/0070687 A1 3/2005 Ideno et al.
2005/0158494 A1* 7/2005 Koyama ................ B32B 27/08 428/35.7
2008/0045659 A1 2/2008 Hakuya et al.
2010/0160494 A1 6/2010 Yonehama et al.
2012/0321227 A1 12/2012 Kumamoto et al.
2014/0194570 A1 7/2014 Kato et al.

FOREIGN PATENT DOCUMENTS

| CN | 102812067 | 12/2012 |
| JP | 5-51574 | 3/1993 |
| JP | 9-316422 | 12/1997 |
| JP | 11-80322 | 3/1999 |
| JP | 2001-354835 | 12/2001 |
| JP | 2002-114835 | 4/2002 |
| JP | 2004-315637 | 11/2004 |
| JP | 2005-54145 | 3/2005 |
| JP | 2005-154386 | 6/2005 |
| JP | 2006-348106 | 12/2006 |
| JP | 2007-500680 | 1/2007 |
| TW | 201311763 | 3/2013 |
| WO | 2005/013921 | 2/2005 |

* cited by examiner

ACTIVE-ENERGY-RAY-CURABLE RESIN, AND GAS BARRIER LAMINATE COMPRISING CURED PRODUCT OF SAID RESIN

TECHNICAL FIELD

The present invention relates to an active-energy-ray-curable resin and a gas barrier laminate comprising a cured product of the resin. Further, the present invention also relates to a composition comprising the above-described resin and a method for preparing the resin.

BACKGROUND ART

Recently, as packaging materials, for the reasons of the strength, the ability to protect products, aptitude for working environment, advertising effects by printing thereon, etc., complex flexible films obtained by combining different types of polymer materials have been mainly used. Such complex films generally have a thermoplastic film layer as an outer layer which plays a role of product protection, and a thermoplastic film layer as a sealant layer. For bonding these layers, a dry lamination method, in which an adhesive is applied to a laminated film layer to bond a sealant layer thereto, or an extrusion lamination method, in which an anchor coating agent is applied to a laminated film layer according to need and a melted plastic film to be a sealant layer is bonded thereto under pressure to provide film-like lamination, is employed. As the adhesive to be used in these methods, in general, a two-liquid type polyurethane-based adhesive consisting of a main ingredient having an active hydrogen group such as a hydroxyl group and a curing agent having an isocyanate group is mainly used because of high adhesive performance thereof (for example, see Patent Document 1 and Patent Document 2).

Further, recently, packaging materials to be used in the field of packaging of foods, pharmaceutical products, electronic precision components, etc. are required to have gas barrier properties for blocking gas, because influence of oxygen which permeates the packaging materials must be prevented in order to prevent deterioration of contents. In particular, in the case of foods, in order to suppress oxidation of oils and fats, deterioration of proteins, etc. to keep taste and freshness, in the case of pharmaceutical products, in order to suppress deterioration of an active ingredient to maintain efficacy, and in the case of electronic precision components, in order to suppress corrosion of metal parts to prevent insulation failure, packaging materials are required to have gas barrier properties.

For these reasons, various gas barrier layers such as an inorganic vapor deposition film obtained by deposition of aluminium foil, alumina ($Al_2O_3$), silica ($SiO_2$) or the like, a polyvinylidene chloride (PVDC)-coated layer and a polyvinyl alcohol (PVA)-coated layer have been generally used.

Meanwhile, as a method for obtaining an excellent film in a short time without carrying out the heat treatment at a high temperature, use of an active-energy-ray-curable resin is mentioned. Curing of the active-energy-ray-curable resin is instantly progressed by ultraviolet irradiation to form a cured product. Therefore, high-temperature or long-time curing, which is required for curing general thermosetting resins, is not required. For this reason, the active-energy-ray-curable resin has been studied recently for the development of a wide range of applications including adhesives, printing inks and coating materials for parts which are easily damaged by heat. However, almost no active-energy-ray-curable resin having gas barrier properties is known. For example, a method of using a solution of a polyvalent metal salt of an unsaturated carboxylic acid compound is known (see Patent Document 3).

PRIOR ART DOCUMENTS

Patent Documents

Patent Document 1: Japanese Laid-Open Patent Publication No. H05-51574
Patent Document 2: Japanese Laid-Open Patent Publication No. H09-316422
Patent Document 3: Japanese Laid-Open Patent Publication No. 2006-348106

SUMMARY

Technical Problem

For the purpose of realizing better view of contents and easier detection of inclusion of metals by a metal detector, a material having excellent transparency is desired.

A packaging material made by using an inorganic vapor deposition film obtained by deposition of alumina ($Al_2O_3$), silica ($SiO_2$) or the like is transparent and has excellent gas barrier properties. However, when the film is bent, a crack is generated in the vapor deposition layer and the gas barrier properties are significantly reduced.

A film coated with polyvinylidene chloride is transparent and exerts good barrier properties. However, when it is incinerated as the general waste, organic substances such as acid gas are generated, and therefore, it has been desired to use other materials instead thereof with the growing interest in the environment.

A film coated with polyvinyl alcohol has excellent gas barrier properties under low-humidity environment. However, it has very high absorbency, and when the relative humidity is about 70% or higher, the gas barrier properties are rapidly reduced. Further, for the purpose of preventing reduction of gas barrier properties of polyvinyl alcohol under high-humidity environment, a method of coating a composition of polyvinyl alcohol and poly(meth)acrylic acid may be employed. However, in this case, high-temperature and long-time heating is required at the time of esterification, and it causes a problem of productivity.

In the case of the method of using a solution of a polyvalent metal salt of an unsaturated carboxylic acid compound described above, after prepolymerization with active energy ray, a drying step is required to be carried out, and then polymerization with active energy ray is required to be carried out. Therefore, not only the operation is complicated, but also a photopolymerization initiator is essential for curing with active energy ray.

The problem to be solved by the present invention is to provide an active-energy-ray-curable resin having excellent transparency and workability, wherein a cured product having excellent gas barrier properties can be obtained without carrying out the heat treatment at a high temperature, and a gas barrier laminate comprising a cured product of the resin.

Solution to Problem

For example, the present invention is as follows:

First Embodiment

[1-1] A resin obtained by reacting a reaction product, which is obtained by Michael addition reaction between the following component (A) and the following component (B) and a subsequent amide group formation reaction, with the following component (C):

(A) an aliphatic diamine having 2 to 8 carbon atoms or a diamine having a $C_{6-8}$ aromatic ring;

(B) an unsaturated carboxylic acid represented by formula (2) below and/or a derivative thereof, provided that the following component (C) is excluded:

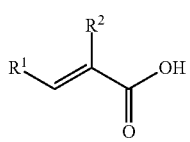

(2)

[in formula (2), $R^1$ and $R^2$ each independently represent a hydrogen atom, an alkyl group having 1 to 8 carbon atoms, an aralkyl group having 1 to 8 carbon atoms or an aryl group]; and (C) a (meth)acrylic acid-based compound having at least one glycidyl or isocyanate group.

[1-2] The resin according to item [1-1], wherein the component (A) is m-xylylenediamine or p-xylylenediamine.

[1-3] The resin according to item [1-1] or [1-2], wherein the component (B) is acrylic acid, methacrylic acid, crotonic acid and/or a derivative thereof.

[1-4] The resin according to any one of items [1-1] to [1-3], wherein the component (C) is glycidyl (meth)acrylate or 2-isocyanatoethyl (meth)acrylate.

[1-5] The resin according to any one of items [1-1] to [1-4], wherein the derivative in the component (B) is at least one selected from the group consisting of an ester, an amide, an acid anhydride and an acid chloride.

[1-5-1] The resin according to any one of items [1-1] to [1-4], wherein the component (B) is a carboxylic acid, an ester or an amide, and wherein the reaction between the component (A) and the component (B) is carried out at 0 to 130° C.

[1-5-2] The resin according to any one of items [1-1] to [1-4], wherein the component (B) is an acid anhydride or an acid chloride, and wherein the reaction between the component (A) and the component (B) is carried out at 0 to 150° C.

[1-5-3] The resin according to any one of items [1-1] to [1-5-2], wherein the reaction molar ratio between the component (A) and the component (B) [(B)/(A)] is 0.2 to 1.0.

[1-5-4] The resin according to any one of items [1-1] to [1-5-3], wherein the reaction molar ratio between the reaction product, which is obtained from the component (A) and the component (B), and the component (C) [(C)/{(A)+(B)}] is 0.1 to 1.0.

[1-6] A resin having a structure represented by general formula (1) below:

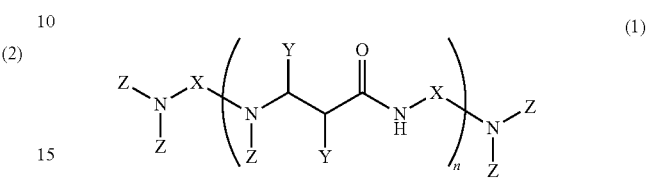

(1)

[in formula (1):

X represents an aliphatic hydrocarbon group having 2 to 8 carbon atoms or a hydrocarbon group having a $C_{6-8}$ aromatic ring;

Ys each independently represent a hydrogen atom, an alkyl group having 1 to 8 carbon atoms, an aralkyl group having 1 to 8 carbon atoms or an aryl group;

Zs each independently represent a hydrogen atom, a (meth)acryloxyalkyl group which may have a hydroxyl group, or a (meth)acryloxyalkylamidoyl group, provided that the case where all the Zs are a hydrogen atom is excluded; and n represents an integer of 1 to 1000].

[1-7] The resin according to item [1-6], wherein X is a hydrocarbon group having a $C_{6-8}$ aromatic ring.

[1-8] The resin according to item [1-6] or [1-7], wherein Ys each independently represent a hydrogen atom, an alkyl group having 1 to 3 carbon atoms, an aralkyl group having 1 to 8 carbon atoms or an aryl group.

[1-9] A resin having a structure represented by general formula (a) below:

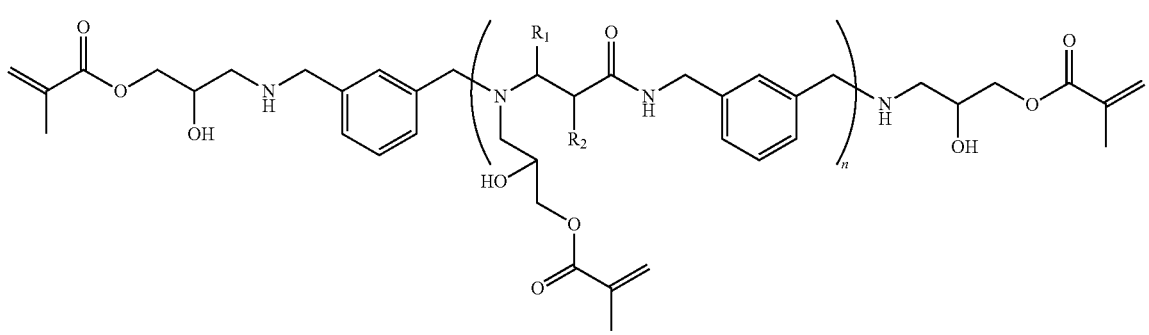

(a)

[in formula (a), $R_1$ and $R_2$ each independently represent a hydrogen atom or a methyl group; and n represents an integer of 1 to 1000].

[1-10] A resin composition containing the resin according to any one of items [1-1] to [1-9].

[1-11] A cured product obtained by curing the resin composition according to item [1-10].

[1-12] The cured product according to item [1-11], wherein the oxygen transmission coefficient is 2.0 ml·mm/ $m^2$·day·MPa (23° C., 60% RH) or less.

[1-13] A coating material containing the resin according to any one of items [1-1] to [1-9].

[1-14] An adhesive containing the resin according to any one of items [1-1] to [1-9].

[1-15] A method for preparing a resin comprising reacting a reaction product, which is obtained by Michael addition reaction between the following component (A) and the following component (B) and a subsequent amide group formation reaction, with the following component (C):

(A) an aliphatic diamine having 2 to 8 carbon atoms or a diamine having a $C_{6-8}$ aromatic ring;

(B) an unsaturated carboxylic acid represented by formula (2) below and/or a derivative thereof, provided that the following component (C) is excluded:

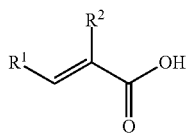

(2)

[in formula (2), $R^1$ and $R^2$ each independently represent a hydrogen atom, an alkyl group having 1 to 8 carbon atoms, an aralkyl group having 1 to 8 carbon atoms or an aryl group]; and (C) a (meth)acrylic acid-based compound having at least one glycidyl or isocyanate group.

Second Embodiment

[a] A gas barrier laminate comprising a base material layer and at least one gas barrier layer, wherein the gas barrier layer comprises a cured product of the resin according to any one of items [1-1] to [1-9] in the above-described first embodiment.

[b] The gas barrier laminate according to item [a], wherein the base material layer is at least one selected from the group consisting of a flexible polymer film layer, a paper layer and a metal foil layer.

[c] The gas barrier laminate according to item [a] or [b], wherein the gas barrier layer is arranged on at least one laminate surface of the gas barrier laminate.

[d] The gas barrier laminate according to any one of items [a] to [c], wherein the flexible polymer film layer is a polyolefin-based film, a polyester-based film or a polyamide-based film.

[e] The gas barrier laminate according to any one of items [a] to [c], wherein the metal foil layer is an aluminum foil.

[f] The gas barrier laminate according to any one of items [a] to [e], wherein the oxygen transmission coefficient of the gas barrier layer is 2.0 ml·mm/m²·day·MPa (23° C., 60% RH) or less.

[2-1] A gas barrier coated film in which at least one surface of one layer selected from a flexible polymer film layer (F), a paper layer (P) and a metal foil layer (M) is coated with a gas barrier layer, wherein the gas barrier layer is formed by curing a resin obtained by reacting a reaction product, which is obtained by Michael addition reaction between the following component (A) and the following component (B) and a subsequent amide group formation reaction, with the following component (C):

(A) an aliphatic diamine having 2 to 8 carbon atoms or a diamine having a $C_{6-8}$ aromatic ring;

(B) an unsaturated carboxylic acid represented by formula (2) below and/or a derivative thereof, provided that the following component (C) is excluded:

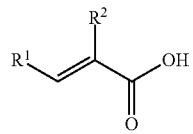

(2)

[in formula (2), $R^1$ and $R^2$ each independently represent a hydrogen atom, an alkyl group having 1 to 8 carbon atoms, an aralkyl group having 1 to 8 carbon atoms or an aryl group]; and (C) a (meth)acrylic acid-based compound having at least one glycidyl or isocyanate group.

[2-2] The gas barrier coated film according to item [2-1], wherein the component (A) is m-xylylenediamine or p-xylylenediamine.

[2-3] The gas barrier coated film according to item [2-1] or [2-2], wherein the component (B) is acrylic acid, methacrylic acid, crotonic acid and/or a derivative thereof.

[2-4] The gas barrier coated film according to any one of items [2-1] to [2-3], wherein the component (C) is glycidyl (meth)acrylate or 2-isocyanatoethyl (meth)acrylate.

[2-5] The gas barrier coated film according to any one of items [2-1] to [2-4], wherein the derivative in the component (B) is at least one selected from the group consisting of an ester, an amide, an acid anhydride and an acid chloride.

[2-6] The gas barrier coated film according to any one of items [2-1] to [2-5], wherein the resin comprises a cured product of a resin having a structure represented by general formula (1) below:

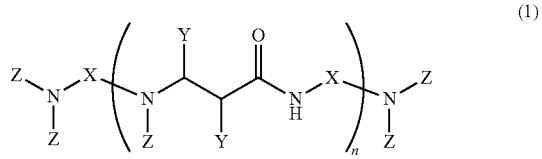

(1)

[in formula (1),

X represents an aliphatic hydrocarbon group having 2 to 8 carbon atoms or a hydrocarbon group having a $C_{6-8}$ aromatic ring;

Ys each independently represent a hydrogen atom, an alkyl group having 1 to 8 carbon atoms, an aralkyl group having 1 to 8 carbon atoms or an aryl group;

Zs each independently represent a hydrogen atom, a (meth)acryloxyalkyl group which may have a hydroxyl group, or a (meth)acryloxyalkylamidoyl group, provided that the case where all the Zs are a hydrogen atom is excluded; and n represents an integer of 1 to 1000].

[2-7] The gas barrier coated film according to item [2-6], wherein X is a hydrocarbon group having a $C_{6-8}$ aromatic ring.

[2-8] The gas barrier coated film according to item [2-6] or [2-7], wherein Ys each independently represent a hydrogen atom, an alkyl group having 1 to 3 carbon atoms, an aralkyl group having 1 to 8 carbon atoms or an aryl group.

[2-9] The gas barrier coated film according to any one of items [2-1] to [2-8], wherein the oxygen transmission coefficient of the gas barrier layer is 2.0 ml·mm/m²·day·MPa (23° C., 60% RH) or less.

[2-10] The gas barrier coated film according to any one of items [2-1] to [2-9], wherein the flexible polymer film layer (F) is a polyolefin-based film, a polyester-based film or a polyamide-based film.

[2-11] The gas barrier coated film according to any one of items [2-1] to [2-9], wherein the metal foil layer (M) is an aluminum foil.

Third Embodiment

[g] The gas barrier laminate according to item [a] or [b] of the above-described second embodiment, which has two or more base material layers, wherein the gas barrier layer is arranged between any two of the base material layers.

[h] The gas barrier laminate according to item [g], wherein the flexible polymer film layer is a polyolefin-based film, a polyester-based film or a polyamide-based film.

[i] The gas barrier laminate according to item [g], wherein the metal foil layer is an aluminum foil.

[j] The gas barrier laminate according to any one of items [g] to [i], wherein the oxygen transmission coefficient of the gas barrier layer is 2.0 ml·mm/m$^2$·day·MPa (23° C., 60% RH) or less.

[3-1] A gas barrier laminate comprising: at least one base material layer selected from the group consisting of a flexible polymer film layer, a paper layer and a metal foil layer; and at least one gas barrier layer, wherein the gas barrier layer is formed by curing a resin obtained by reacting a reaction product, which is obtained by Michael addition reaction between a component (A) and a component (B) and a subsequent amide group formation reaction, with a component (C):

(A) an aliphatic diamine having 2 to 8 carbon atoms or a diamine having a C$_{6-8}$ aromatic ring;

(B) an unsaturated carboxylic acid represented by formula (2) below and/or a derivative thereof, provided that the component (C) is excluded:

$$R^1 \diagdown \!\!\!\!\!\!\!\!\!\overset{R^2}{=}\!\!\!\!\!\!\!\!\! \diagup \!\!\! \underset{O}{C}\!\!-\!\!OH \tag{2}$$

[in formula (2), R$^1$ and R$^2$ each independently represent a hydrogen atom, an alkyl group having 1 to 8 carbon atoms, an aralkyl group having 1 to 8 carbon atoms or an aryl group]; and (C) a (meth)acrylic acid-based compound having at least one glycidyl or isocyanate group.

[3-2] The gas barrier laminate according to item [3-1], wherein the component (A) is m-xylylenediamine or p-xylylenediamine.

[3-3] The gas barrier laminate according to item [3-1] or [3-2], wherein the component (B) is acrylic acid, methacrylic acid, crotonic acid and/or a derivative thereof.

[3-4] The gas barrier laminate according to any one of items [3-1] to [3-3], wherein the component (C) is glycidyl (meth)acrylate or 2-isocyanatoethyl (meth)acrylate.

[3-5] The gas barrier laminate according to any one of items [3-1] to [3-4], wherein the derivative in the component (B) is at least one selected from the group consisting of an ester, an amide, an acid anhydride and an acid chloride.

[3-6] The gas barrier laminate according to any one of items [3-1] to [3-5], wherein the resin comprises a cured product of a resin having a structure represented by general formula (1) below:

$$Z\diagdown\!\!\!\underset{Z}{\overset{|}{N}}\!\!-\!\!X\!\!-\!\!\left(\!\!\underset{Z}{\overset{|}{N}}\!\!-\!\!\overset{Y}{\underset{Y}{C}}\!\!-\!\!\overset{O}{\underset{H}{C}}\!\!-\!\!\underset{}{N}\!\!-\!\!X\!\!\right)_{\!\!n}\!\!\!\underset{Z}{\overset{|}{N}}\!\!\diagup Z \tag{1}$$

[in formula (1),

X represents an aliphatic hydrocarbon group having 2 to 8 carbon atoms or a hydrocarbon group having a C$_{6-8}$ aromatic ring;

Ys each independently represent a hydrogen atom, an alkyl group having 1 to 8 carbon atoms, an aralkyl group having 1 to 8 carbon atoms or an aryl group;

Zs each independently represent a hydrogen atom, a (meth)acryloxyalkyl group which may have a hydroxyl group, or a (meth)acryloxyalkylamidoyl group, provided that the case where all the Zs are a hydrogen atom is excluded; and n represents an integer of 1 to 1000].

[3-7] The gas barrier laminate according to item [3-6], wherein X is a hydrocarbon group having a C$_{6-8}$ aromatic ring.

[3-8] The gas barrier laminate according to item [3-6] or [3-7], wherein Ys each independently represent a hydrogen atom, an alkyl group having 1 to 3 carbon atoms, an aralkyl group having 1 to 8 carbon atoms or an aryl group.

[3-9] The gas barrier laminate according to any one of items [3-1] to [3-8], wherein the oxygen transmission coefficient of the gas barrier layer is 2.0 ml·mm/m$^2$·day·MPa (23° C., 60% RH) or less.

[3-10] The gas barrier laminate according to any one of items [3-1] to [3-9], wherein the flexible polymer film layer (F) is a polyolefin-based film, a polyester-based film or a polyamide-based film.

[3-11] The gas barrier laminate according to any one of items [3-1] to [3-9], wherein the metal foil layer (M) is an aluminum foil.

Fourth Embodiment

[k] The gas barrier laminate according to any one of items [a] to [j], further comprising a silica vapor deposition layer, an alumina vapor deposition layer or a silica/alumina binary vapor deposition layer.

[l] A multilayer packaging material comprising the gas barrier laminate according to item [k].

[m] A bag for packaging obtained by producing the bag using the multilayer packaging material according to item [l].

[4-1] A coated film, which at least has: a base material (F); a silica vapor deposition layer, an alumina vapor deposition layer or a silica/alumina binary vapor deposition layer (V); and a coat layer (G), wherein the coat layer (G) is formed by curing a resin obtained by reacting a reaction product, which is obtained by Michael addition reaction between the following component (A) and the following component (B) and a subsequent amide group formation reaction, with the following component (C):

(A) an aliphatic diamine having 2 to 8 carbon atoms or a diamine having a $C_{6-8}$ aromatic ring;

(B) an unsaturated carboxylic acid represented by formula (2) below and/or a derivative thereof, provided that the component (C) is excluded:

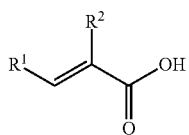

(2)

[in formula (2), $R^1$ and $R^2$ each independently represent a hydrogen atom, an alkyl group having 1 to 8 carbon atoms, an aralkyl group having 1 to 8 carbon atoms or an aryl group]; and (C) a (meth)acrylic acid-based compound having at least one glycidyl or isocyanate group.

[4-2] The coated film according to item [4-1], wherein the component (A) is m-xylylenediamine or p-xylylenediamine.

[4-3] The coated film according to item [4-1] or [4-2], wherein the component (B) is acrylic acid, methacrylic acid, crotonic acid and/or a derivative thereof.

[4-4] The coated film according to any one of items [4-1] to [4-3], wherein the component (C) is glycidyl (meth)acrylate or 2-isocyanatoethyl (meth)acrylate.

[4-5] The coated film according to any one of items [4-1] to [4-4], wherein the derivative in the component (B) is at least one selected from the group consisting of an ester, an amide, an acid anhydride and an acid chloride.

[4-6] The coated film according to any one of items [4-1] to [4-5], wherein the resin comprises a cured product of a resin having a structure represented by general formula (1) below:

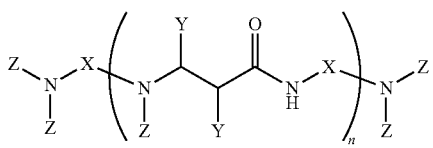

(1)

[in formula (1),

X represents an aliphatic hydrocarbon group having 2 to 8 carbon atoms or a hydrocarbon group having a $C_{6-8}$ aromatic ring;

Ys each independently represent a hydrogen atom, an alkyl group having 1 to 8 carbon atoms, an aralkyl group having 1 to 8 carbon atoms or an aryl group;

Zs each independently represent a hydrogen atom, a (meth)acryloxyalkyl group which may have a hydroxyl group, or a (meth)acryloxyalkylamidoyl group, provided that the case where all the Zs are a hydrogen atom is excluded; and n represents an integer of 1 to 1000].

[4-7] The coated film according to item [4-6], wherein X is a hydrocarbon group having a $C_{6-8}$ aromatic ring.

[4-8] The coated film according to item [4-6] or [4-7], wherein Ys each independently represent a hydrogen atom, an alkyl group having 1 to 3 carbon atoms, an aralkyl group having 1 to 8 carbon atoms or an aryl group.

[4-9] The coated film according to any one of items [4-1] to [4-8], wherein the oxygen transmission coefficient of the coat layer (G) is 2.0 ml·mm/m²·day·MPa (23° C., 60% RH) or less.

Fifth Embodiment

[n] The gas barrier laminate according to any one of items [a] to [k], further comprising a sealant layer.

[o] A multilayer packaging material comprising the gas barrier laminate according to item [n].

[p] A bag for packaging obtained by producing the bag using the multilayer packaging material according to item [o].

[5-1] A laminate obtained by at least laminating: a base material (F); a silica vapor deposition layer, an alumina vapor deposition layer or a silica/alumina binary vapor deposition layer (V); an adhesive layer (G); and a sealant layer (S), wherein the adhesive layer (G) is formed by curing a resin obtained by reacting a reaction product, which is obtained by Michael addition reaction between the following component (A) and the following component (B) and a subsequent amide group formation reaction, with the following component (C):

(A) an aliphatic diamine having 2 to 8 carbon atoms or a diamine having a $C_{6-8}$ aromatic ring;

(B) an unsaturated carboxylic acid represented by formula (2) below and/or a derivative thereof, provided that the following component (C) is excluded:

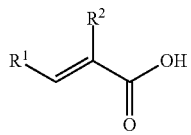

(2)

[in formula (2), $R^1$ and $R^2$ each independently represent a hydrogen atom, an alkyl group having 1 to 8 carbon atoms, an aralkyl group having 1 to 8 carbon atoms or an aryl group]; and (C) a (meth)acrylic acid-based compound having at least one glycidyl or isocyanate group.

[5-2] The laminate according to item [5-1], wherein the component (A) is m-xylylenediamine or p-xylylenediamine.

[5-3] The laminate according to item [5-1] or [5-2], wherein the component (B) is acrylic acid, methacrylic acid, crotonic acid and/or a derivative thereof.

[5-4] The laminate according to any one of items [5-1] to [5-3], wherein the component (C) is glycidyl (meth)acrylate or 2-isocyanatoethyl (meth)acrylate.

[5-5] The laminate according to any one of items [5-1] to [5-4], wherein the derivative in the component (B) is at least one selected from the group consisting of an ester, an amide, an acid anhydride and an acid chloride.

[5-6] The laminate according to any one of items [5-1] to [5-5], wherein the resin comprises a cured product of a resin having a structure represented by general formula (1) below:

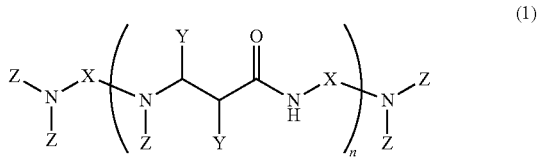

(1)

[in formula (1),

X represents an aliphatic hydrocarbon group having 2 to 8 carbon atoms or a hydrocarbon group having a $C_{6-8}$ aromatic ring;

Ys each independently represent a hydrogen atom, an alkyl group having 1 to 8 carbon atoms, an aralkyl group having 1 to 8 carbon atoms or an aryl group;

Zs each independently represent a hydrogen atom, a (meth)acryloxyalkyl group which may have a hydroxyl group, or a (meth)acryloxyalkylamidoyl group, provided that the case where all the Zs are a hydrogen atom is excluded; and n represents an integer of 1 to 1000].

[5-7] The laminate according to item [5-6], wherein X is a hydrocarbon group having a $C_{6-8}$ aromatic ring.

[5-8] The laminate according to item [5-6] or [5-7], wherein Ys each independently represent a hydrogen atom, an alkyl group having 1 to 3 carbon atoms, an aralkyl group having 1 to 8 carbon atoms or an aryl group.

[5-9] The laminate according to any one of items [5-1] to [5-8], wherein the oxygen transmission coefficient of the adhesive layer (G) is 2.0 ml·mm/m²·day·MPa (23° C., 60% RH) or less.

[5-10] A multilayer packaging material comprising the laminate according to any one of items [5-1] to [5-9].

[5-11] A bag for packaging obtained by producing the bag using the multilayer packaging material according to item [5-10].

Advantageous Effects of Invention

According to the present invention, it is possible to provide an active-energy-ray-curable resin having excellent transparency and workability, wherein a cured product having excellent gas barrier properties can be obtained without carrying out the heat treatment at a high temperature, and a gas barrier laminate comprising a cured product of the resin.

DESCRIPTION OF EMBODIMENTS

Hereinafter, embodiments of the present invention will be described in detail.

First Embodiment

Resin and Method for Preparing the Resin

In one embodiment, the resin of the present invention can be obtained by reacting a reaction product, which is obtained by Michael addition reaction between the following component (A) as mentioned below and the following component (B) as mentioned below and a subsequent amide group formation reaction, with the following component (C) as mentioned below:

(A) an aliphatic diamine having 2 to 8 carbon atoms or a diamine having a $C_{6-8}$ aromatic ring;

(B) an unsaturated carboxylic acid represented by formula (2) below and/or a derivative thereof, provided that the following component (C) is excluded:

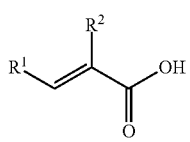

(2)

[in formula (2), $R^1$ and $R^2$ each independently represent a hydrogen atom, an alkyl group having 1 to 8 carbon atoms, an aralkyl group having 1 to 8 carbon atoms or an aryl group]; and (C) a (meth)acrylic acid-based compound having at least one glycidyl or isocyanate group.

Examples of the component (A) include ethylenediamine, trimethylenediamine, 1,2-diaminopropane, tetramethylenediamine, 2-methyl-1,3-propanediamine, pentamethylenediamine, hexamethylenediamine, 1,5-diamino-2-methylpentane, N-isopropyl-1,3-propanediamine, 1,3-cyclohexanediamine, heptamethylenediamine, octamethylenediamine, 1,3-bis(aminomethyl)cyclohexane, 3-aminobenzylamine, 4-aminobenzylamine, 1,3-phenylenediamine, 1,4-phenylenediamine, m-xylylenediamine and p-xylylenediamine. From the viewpoint of gas barrier properties, ethylenediamine, trimethylenediamine, tetramethylenediamine, m-xylylenediamine and p-xylylenediamine are preferred, m-xylylenediamine and p-xylylenediamine are more preferred, and m-xylylenediamine is even more preferred. As the component (A), such substances may be used solely, or two or more of them may be used in combination.

Examples of the component (B) include acrylic acid and/or a derivative thereof (e.g., methyl acrylate, ethyl acrylate, n-propyl acrylate, isopropyl acrylate, 2-hydroxyethyl acrylate, n-butyl acrylate, isobutyl acrylate, 2-hydroxybutyl acrylate, n-octyl acrylate, 2-ethylhexyl acrylate, phenyl acrylate, benzyl acrylate, acrylamide and diacrylic anhydride), and an unsaturated carboxylic acid such as acryloyl chloride, methacrylic acid, 2-ethylacrylic acid, 2-propylacrylic acid, α-isopropylacrylic acid, 2-n-butylacrylic acid, 2-t-butylacrylic acid, 2-pentylacrylic acid, α-phenylacrylic acid, α-benzylacrylic acid, crotonic acid, 2-pentenoic acid, 2-hexenoic acid, 4-methyl-2-pentenoic acid, 2-heptenoic acid, 4-methyl-2-hexenoic acid, 5-methyl-2-hexenoic acid, 4,4-dimethyl-2-pentenoic acid, 4-phenyl-2-butenoic acid, cinnamic acid, o-methylcinnamic acid, m-methylcinnamic acid, p-methylcinnamic acid, 2-octenoic acid, 2-nonenoic acid, 2-decenoic acid and 2-undecenoic acid and/or a derivative thereof. Examples of the derivative include an ester, an amide, an acid anhydride and an acid chloride. However, in the present invention, the below-described component (C) is excluded from the component (B). Further, from the viewpoint of gas barrier properties, the component (B) is preferably acrylic acid, methacrylic acid, crotonic acid and/or a derivative thereof, more preferably acrylic acid, methacrylic acid and/or a derivative thereof, and even more preferably acrylic acid, methacrylic acid and/or a $C_{1-3}$ alkyl ester thereof. As the component (B), such substances may be used solely, or two or more of them may be used in combination.

Examples of the component (C) include glycidyl (meth)acrylate, 2-isocyanatoethyl acrylate, 2-isocyanatoethyl methacrylate, 1,1-(bisacryloyloxymethyl)ethyl isocyanate and 2-isocyanatoethyloxyethyl methacrylate. Preferred are glycidyl acrylate and glycidyl (meth)acrylate because a hydroxyl group, which is advantageous for gas barrier properties, is produced in a reaction with an amino group. As the component (C), such substances may be used solely, or two or more of them may be used in combination.

In the method for preparing the resin of the present invention, in addition to the components (A) to (C), other components may be further reacted therewith within a range in which the effects of the present invention are not reduced. Examples of the other components include malic acid, tartaric acid, adipic acid, isophthalic acid and terephthalic acid or a derivative thereof, a $C_{1-8}$ monovalent carboxylic acid or a derivative thereof, a cyclic carbonate and a monoepoxy compound. In this regard, the amount of the "other components" to be used is preferably 30% by mass or less, more preferably 20% by mass or less, and even more preferably 10% by mass or less of the total amount of reaction components to constitute the resin.

In the Michael addition reaction between the component (A) and the component (B), when using a carboxylic acid, an ester or an amide as the component (B), the component (A) is mixed with the component (B) at a temperature of 0 to 130° C., and more preferably at a temperature of 0 to 110° C. Further, the amide group formation reaction (amide bond formation reaction) after the Michael addition reaction is carried out by means of dehydration, dealcoholization and deamination at a temperature of 100 to 300° C., and more preferably at a temperature of 130 to 250° C.

In this case, in the amide group formation reaction, in order to complete the reaction, the pressure in a reaction apparatus can be reduced in the final stage of the reaction according to need. Further, dilution can also be carried out using a non-reactive solvent according to need. Moreover, catalysts such as phosphite esters can be added as a dehydration agent and a dealcoholization agent.

Meanwhile, when using an acid anhydride or an acid chloride as the component (B), the resin is prepared by mixing the component (A) with the component (B) at a temperature of 0 to 150° C., and preferably at a temperature of 0 to 100° C. to carry out the Michael addition reaction, and subsequently carrying out the amide group formation reaction. In this case, in the amide group formation reaction, in order to complete the reaction, the pressure in a reaction apparatus can be reduced in the final stage of the reaction according to need. Further, dilution can also be carried out using a non-reactive solvent according to need. Moreover, a tertiary amine such as pyridine, picoline, lutidine and trialkylamine can be added.

The site containing an amide group introduced by the above-described reaction has strong cohesive force. When the site containing the amide group exists in the resin at a high ratio, higher oxygen barrier properties and good adhesive strength for base materials such as metals, concrete and plastics can be obtained.

Further, regarding the reaction ratio between the component (A) and the component (B), the reaction molar ratio [(B)/(A)] is preferably from 0.3 to 1.0. When the reaction molar ratio is 0.3 or more, a sufficient amount of the amide group is produced in a resin obtained, and high levels of gas barrier properties and adhesive properties are exerted. Meanwhile, when the reaction molar ratio is 1.0 or less, the amount of the amino group in the reaction product obtained from the component (A) and the component (B) described below is sufficient for the reaction with the component (C), and therefore, excellent heat resistance and impact resistance are exerted and excellent solubility for various organic solvents and water is provided.

When high gas barrier properties of a resin obtained and excellent coating performance are particularly taken into consideration, the reaction molar ratio between the component (A) and the component (B) [(B)/(A)] is more preferably from 0.5 to 1.0.

The reaction of the component (C) with the reaction product obtained from the component (A) and the component (B) is carried out by adding the component (C) to the reaction product obtained from the component (A) and the component (B) at a temperature of 10 to 100° C. and reacting the mixture at a temperature of 20 to 100° C. By employing the above-described temperature conditions, thermal polymerization of acrylic groups can be avoided and a resin can be obtained stably. Moreover, according to need, a radical polymerization inhibitor can be added. The radical polymerization inhibitor is not particularly limited, and examples thereof include hydroquinone, methylhydroquinone, hydroquinone monomethyl ether, 2,6-di-t-butyl-4-methylphenol (BHT), 2,5-diphenyl-p-benzoquinone and mono-t-butyl-p-benzoquinone. The amount of the radical polymerization inhibitor to be added is preferably 0.0005 to 2 parts by weight, and more preferably 0.0005 to 1 parts by mass relative to 100 parts by mass of the total amount of the reaction product obtained from the component (A) and the component (B) and the component (C).

In the reaction of the component (C) with the reaction product obtained from the component (A) and the component (B), the reaction molar ratio [(C)/{(A)+(B)}] is preferably from 0.1 to 1.0, and more preferably from 0.2 to 0.9. When the reaction molar ratio is 0.1 or more, the amount of the acrylic group required for curing is sufficient, and high levels of gas barrier properties and adhesive properties are exerted. Meanwhile, when the reaction molar ratio is 1.0 or less, cure shrinkage is small and good adhesive properties are exerted.

In one embodiment, the resin of the present invention has a structure represented by general formula (1) below:

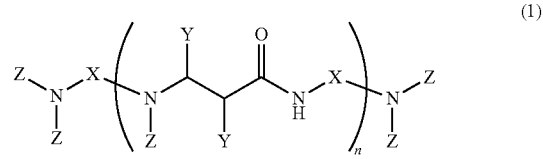

[in formula (1),

X represents an aliphatic hydrocarbon group having 2 to 8 carbon atoms or a hydrocarbon group having a $C_{6-8}$ aromatic ring;

Ys each independently represent a hydrogen atom, an alkyl group having 1 to 8 carbon atoms, an aralkyl group having 1 to 8 carbon atoms or an aryl group;

Zs each independently represent a hydrogen atom, a (meth)acryloxyalkyl group which may have a hydroxyl group, or a (meth)acryloxyalkylamidoyl group, provided that the case where all the Zs are a hydrogen atom is excluded; and n represents an integer of 1 to 1000].

As shown by general formula (1) above, the resin of the present invention preferably has a structure having an amide group and an amino group in the molecule. It is not that it is sufficient when the resin of the present invention has any of various (meth)acrylic groups, and it is important to have a specific (meth)acrylic group, for example, as shown by general formula (1) above, for providing an active-energy-ray-curable resin having excellent gas barrier properties and adhesive properties.

Examples of X in formula (1) include an ethylene group, a tetramethylene group, a hexamethylene group, a 1,3-phenylene group, a 1,4-phenylene group, a m-xylylene group, a p-xylylene group, a hexahydro-m-xylylene group and a hexahydro-p-xylylene group. X is preferably a hydrocarbon group having a $C_{6-8}$ aromatic ring, more preferably a m-xylylene group or a p-xylylene group, and particularly preferably a m-xylylene group.

Examples of Y in formula (1) include a hydrogen atom, a methyl group, an ethyl group, a propyl group, a benzyl group, a phenethyl group and a phenyl group. Y is preferably a hydrogen atom, an alkyl group having 1 to 3 carbon atoms, an aralkyl group having 1 to 8 carbon atoms or an aryl group, more preferably a hydrogen atom or a methyl group, and particularly preferably a hydrogen atom.

Examples of Z in formula (1) include a (meth)acryloxypropyl group which may have a hydroxyl group, a (meth) acryloxybutyl group which may have a hydroxyl group, a (meth)acryloxy-4-hydroxybutyl group which may have a hydroxyl group and a (meth)acryloxyethylamidoyl group. Z is preferably a (meth)acryloxypropyl group which may have a hydroxyl group or a (meth)acryloxyethylamidoyl group, more preferably a (meth)acryloxypropyl group having a hydroxyl group or a (meth)acryloxyethylamidoyl group, and particularly preferably a (meth)acryloxypropyl group having a hydroxyl group.

The number of cycles, n, in formula (1) is an integer of 1 to 1000, preferably an integer of 1 to 800, more preferably an integer of 1 to 600, and particularly preferably an integer of 1 to 400.

When n is in the above-described range, the amount of the amide group and the hydroxyl group, which act advantageously for gas barrier properties and adhesive properties, becomes sufficient. Moreover, it is possible to easily carry out dilution using a diluent such as a solvent, and good coating suitability is obtained.

In one embodiment, the resin of the present invention has a structure represented by general formula (a) below:

and plastics, in order to support moistening of the surface of each of such base materials, a wetting agent such as silicone and an acrylic compound may be added to the resin composition. Examples of appropriate wetting agents include BYK331, BYK333, BYK340, BYK347, BYK348, BYK378, BYK380 and BYK381 which can be obtained from BYK-Chemie. The amount of the wetting agent to be added is preferably from 0.01 to 2.0% by mass based on the total mass of the resin composition.

Further, in order to improve tackiness for various materials, a tackifier such as xylene resin, terpene resin, phenol resin and rosin resin may be added to the resin composition according to need. The amount of the tackifier to be added is preferably from 0.01 to 2.0% by mass based on the total mass of the resin composition.

In order to improve adhesiveness for various materials, a coupling agent such as a silane coupling agent and a titanium coupling agent may be added to the resin composition. The amount of the coupling agent to be added is preferably from 0.01 to 5.0% by mass based on the total mass of the resin composition.

Further, in order to improve various performances such as impact resistance, an inorganic filler such as silica, alumina, mica, talc, aluminum flake and glass flake may be added to the resin composition. The amount of the inorganic filler to be added is preferably from 0.01 to 10.0% by mass based on the total mass of the resin composition.

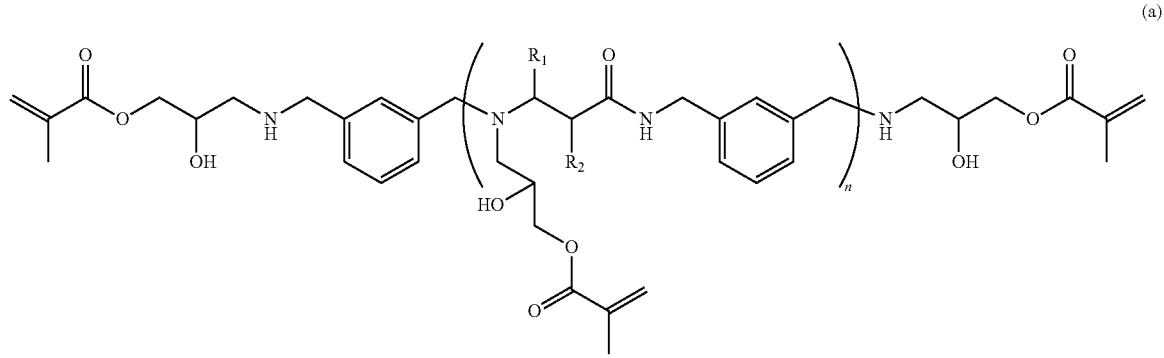

(a)

[in formula (a), $R_1$ and $R_2$ each independently represent a hydrogen atom or a methyl group; and n represents an integer of 1 to 1000].

[Resin Composition]

The resin of the present invention can be used in the form of a resin composition by being mixed with other components. According to need, a thermosetting resin such as a polyurethane-based resin, a polyacrylic resin and a polyurea-based resin and a reactive diluent typified by a monofunctional or polyfunctional (meth)acrylic monomer may be mixed in the resin within a range in which the effects of the present invention are not reduced. Moreover, a reaction product produced by a reaction between the component (C) and the component (A) which remains unreacted in the reaction between the component (A) and the component (B) may be contained in the resin composition of the present invention within a range in which the effects of the present invention are not reduced.

When applying the resin composition of the present invention to general base materials such as metals, concrete Moreover, when the resin composition of the present invention is applied to general base materials such as metals, concrete and plastics, in order to support disappearance of foam generated at the time of mixing with stirring and application, a defoamer made of a silicone-based or acrylic compound may be added to the resin composition. Examples of appropriate defoamers include BYK019, BYK052, BYK065, BYK066N, BYK067N, BYK070 and BYK080 which can be obtained from BYK-Chemie, but BYK065 is particularly preferred. The amount of the defoamer to be added is preferably from 0.01 to 3.0% by mass based on the total mass of the resin composition.

According to need, required amounts of components including an organic solvent such as benzyl alcohol, a rust preventive additive such as zinc phosphate, iron phosphate, calcium molybdate, vanadium oxide, water dispersible silica and fumed silica, an organic pigment such as phthalocyanine-based organic pigments and condensed polycyclic organic pigments and an inorganic pigment such as titanium oxide, zinc oxide, calcium carbonate, barium sulfate, alumina and carbon black may be added to the resin composition of the present invention.

Further, according to need, a compound having oxygen trapping function, etc. may be added to the resin composition of the present invention. Examples of the compound having oxygen trapping function include low-molecular organic compounds which react with oxygen such as hindered phenols, vitamin C, vitamin E, organic phosphorus compounds, gallic acid and pyrogallol and transition metal compounds of cobalt, manganese, nickel, iron, copper, etc.

[Cured Product]

In one embodiment, a cured product obtained by curing the above-described resin composition is provided.

When the resin composition of the present invention is cured by active energy ray, a photopolymerization initiator is not necessarily required. However, when a photopolymerization initiator is added, examples thereof include: Irgacure (registered trademark) 2959 (1-[4-(2-hydroxyethoxy)phenyl]-2-hydroxy-2-methyl-1-propane-1-one), Irgacure (registered trademark) 184 (1-hydroxycyclohexyl phenyl ketone), Irgacure (registered trademark) 500 (1-hydroxycyclohexyl phenyl ketone, benzophenone), Irgacure (registered trademark) 651 (2,2-dimethoxy-1,2-diphenylethane-1-one), Irgacure (registered trademark) 369 (2-benzyl-2-dimethylamino-1-(4-morpholinophenyl)butanone-1), Irgacure (registered trademark) 907 (2-methyl-1-[4-methylthiophenyl]-2-morpholinopropan-1-one), Irgacure (registered trademark) 819 (bis(2,4,6-trimethylbenzoyl)-phenylphosphine oxide), Irgacure (registered trademark) 1800 (bis(2,6-dimethoxybenzoyl)-2,4,4-trimethyl-pentylphosphine oxide, 1-hydroxy-cyclohexyl-phenyl-ketone), Irgacure (registered trademark) 1800 (bis(2,6-dimethoxybenzoyl)-2,4,4-trimethyl-pentylphosphine oxide, 2-hydroxy-2-methyl-1-phenyl-1-propan-1-one), Irgacure (registered trademark) OXE01 (1,2-octanedione, 1-[4-(phenylthio)phenyl]-2-(O-benzoyloxime)), Darocur (registered trademark) 1173 (2-hydroxy-2-methyl-1-phenyl-1-propan-1-one), Darocur (registered trademark) 1116, 1398, 1174 and 1020, and CGI242 (ethanone, 1-[9-ethyl-6-(2-methylbenzoyl)-9H-carbazole-3-yl]-1-(O-acetyloxime)), which can be obtained from Ciba; Lucirin TPO (2,4,6-trimethylbenzoyldiphenylphosphine oxide) and Lucirin TPO-L (2,4,6-trimethylbenzoylethoxyphenylphosphine oxide), which can be obtained from BASF; ESACURE1001M (1-[4-benzoylphenylsulfanyl/phenyl]-2-methyl-2-(4-methylphenylsulfonyl) propane-1-one) which can be obtained from Nihon SiberHegner K.K.; Adekaoptomer (registered trademark) N-1414 (carbazole/phenone-based), Adekaoptomer (registered trademark) N-1717 (acridine-based) and Adekaoptomer (registered trademark) N-1606 (triazine-based), which can be obtained from Asahi Denka; TFE-triazine (2-[2-(furan-2-yl)vinyl]-4,6-bis(trichloromethyl)-1,3,5-triazine) manufactured by Sanwa Chemical Co., Ltd.; TME-triazine (2-[2-(5-methylfuran-2-yl)vinyl]-4,6-bis(trichloromethyl)-1,3,5-triazine) manufactured by Sanwa Chemical Co., Ltd.; MP-triazine (2-(4-methoxyphenyl)-4,6-bis(trichloromethyl)-1,3,5-triazine) manufactured by Sanwa Chemical Co., Ltd.; TAZ-113 (2-[2-(3,4-dimethoxyphenyl)ethenyl]-4,6-bis(trichloromethyl)-1,3,5-triazine) manufactured by Midori Kagaku Co., Ltd.; TAZ-108 (2-(3,4-dimethoxyphenyl)-4,6-bis(trichloromethyl)-1,3,5-triazine) manufactured by Midori Kagaku Co., Ltd.; benzophenone, 4,4'-bisdiethylaminobenzophenone, methyl-2-benzophenone, 4-benzoyl-4'-methyldiphenylsulfide, 4-phenylbenzophenone, ethyl Michler's ketone, 2-chlorothioxanthone, 2-methylthioxanthone, 2-isopropylthioxanthone, 4-isopropylthioxanthone, 2,4-diethylthioxanthone, 1-chloro-4-propoxythioxanthone, 2-methylthioxanthone, thioxanthone ammonium salt, benzoin, 4,4'-dimethoxybenzoin, benzoin methyl ether, benzoin ethyl ether, benzoin isopropyl ether, benzoin isobutyl ether, benzyl dimethyl ketal, 1,1,1-trichloroacetophenone, diethoxyacetophenone and dibenzosuberone, methyl o-benzoylbenzoate, 2-benzoylnaphthalene, 4-benzoylbiphenyl, 4-benzoyldiphenyl ether, 1,4-benzoylbenzene, benzil, 10-butyl-2-chloroacridone, [4-(methylphenylthio)phenyl] phenylmethane), 2-ethylanthraquinone, 2,2-bis(2-chlorophenyl)-4,5,4',5'-tetrakis(3,4,5-trimethoxyphenyl)-1,2'-biimidazole, 2,2-bis(o-chlorophenyl)-4,5,4',5'-tetraphenyl-1,2'-biimidazole, tris(4-dimethylaminophenyl)methane, ethyl-4-(dimethylamino)benzoate, 2-(dimethyl amino)ethyl benzoate and butoxyethyl-4-(dimethylamino)benzoate. These photopolymerization initiators may be used solely, or two or more of them may be used in combination. The amount of the photopolymerization initiator to be added is from 0.01 to 15% by mass, and preferably from 0.1 to 10% by mass in the resin composition.

As the style of coating for applying the resin or resin composition of the present invention to various base materials, for example, any of generally-used coating styles such as bar coater coating, Meyer bar coating, air knife coating, gravure coating, reverse gravure coating, micro gravure coating, micro reverse gravure coater coating, die coater coating, slot die coater coating, vacuum die coater coating, dip coating, spin coat coating, spray coating and brush coating may be used. Roll coating or spray coating is preferred.

The resin or resin composition of the present invention is cured by irradiation with an active energy ray such as visible light, ultraviolet light and electron beam, and in curing, various methods such as electron beam irradiation and ultraviolet light irradiation can be selected. In particular, ultraviolet light irradiation is preferred from the viewpoint of convenience.

When cured by ultraviolet light irradiation, a good cured product can be obtained by irradiation at 50 to 2000 mJ/cm$^2$, and preferably at 100 to 1000 mJ/cm$^2$ using a high-pressure mercury lamp, metal halide lamp, xenon lamp, chemical lamp or the like, which emits a light having a wavelength of 150 to 450 nm. Active energy ray irradiation for curing the resin or resin composition of the present invention may be carried out in air or under an atmosphere of an inert gas such as nitrogen and argon.

When the resin composition of the present invention contains a volatile component (typically a solvent), it is desirable to irradiate the resin composition with the active energy ray after drying the volatile component after applying the resin composition to various base materials. Drying conditions are at 10 to 220° C. for 3 to 20 seconds, preferably at 20 to 180° C. for 3 to 20 seconds, and more preferably at 25 to 150° C. for 3 to 20 seconds.

The oxygen transmission coefficient of the cured product obtained is preferably 2.0 ml·mm/m$^2$·day·MPa (23° C., 60% RH) or less. It is more preferably 1.9 or less, and particularly preferably 1.8 or less.

In the present invention, the oxygen transmission coefficient is measured according to the below-described method of Example A.

[Coating Material]

The resin or resin composition of the present invention can be used as a coating material (coating agent) for materials to be coated, for which conventional coating materials are used, such as plastic containers, metals and concrete. It is also possible to apply the resin or resin composition of the present invention to, for example, various gas permeable base materials requiring high gas barrier properties, to which conventional coating materials are not applied because of low gas barrier properties thereof, for example, films or containers made of plastics such as polyolefin, polyester and polyamide which are used for packaging materials for foods, pharmaceutical products, etc.

[Adhesive]

The resin of the present invention can be used as an adhesive directly or by being mixed with a solvent other than the above-described one and various pigments such as a color pigment and an extender pigment according to need.

The adhesive containing the resin of the present invention can be used for materials to be adhered for which conventional adhesives are used, such as metals and concrete, in the same manner. In addition, it can be used as an adhesive for films requiring high gas barrier properties made of plastics such as polyolefin, polyester and polyamide which are used for packaging materials for pharmaceutical products, etc., to which conventional adhesives are not applied because of low gas barrier properties thereof.

Example A

Hereinafter, the above-described first embodiment will be specifically described by way of examples. However, the present invention is not limited by these examples.

Methods for evaluating performances of the resin composition (coating material or adhesive) are as described below.

<Oxygen Transmission Coefficient (ml·Mm/m$^2$·Day·MPa)>

The oxygen transmission rates of a coated film, which was prepared by applying the resin composition to a base material according to the method described in the Examples and Comparative Examples and curing the resin composition, and the base material itself were measured. The measurement was carried out with an oxygen transmission rate measurement apparatus (OX-TRAN2/21 manufactured by Modern Control) under conditions of 23° C. and 60% RH. The oxygen transmission coefficient of the cured product of the resin composition was calculated using the following formula:

$$1/R_1=1/R_2+DFT/P$$

In this regard:

$R_1$: oxygen transmission rate of coated film (ml/m$^2$·day·MPa)

$R_2$: oxygen transmission rate of base material (ml/m$^2$·day·MPa)

DFT: thickness of cured product of resin composition (mm)

P: oxygen transmission coefficient of cured product of resin composition

<Adhesiveness>

Cross-cut test: The method specified by JIS K-5600-5-6 was used. A grid-like pattern having 25 squares (with 2 mm intervals) was formed by scratching on a coated film, a cellophane tape was attached onto this grid-like pattern, and evaluation was carried out based on the remaining ratio of the coated film after peeling off the tape at once.

Laminate strength (g/15 mm): The method specified by JIS K-6854 was used. The laminate strength of a laminated film prepared according to the method described in the Examples was measured by the T-type peeling test at a peel rate of 300 min/min.

<Pencil Hardness>

Evaluation was carried out according to the method specified by JIS K-5600 using a pencil scratch hardness tester. A pencil was set on a coated film at an angle of 45°, a load (750 g) was applied from above and the film was scratched (about 5 mm), and evaluation was carried out based on the hardness of a pencil by which no scratch was made 4 times or more out of 5 times.

<Curl>

A sheet cut off to have a size of 100×100 mm was put on a flat stage with its convex surface upward, the distance of the central portion floating above the stage was measured and the judgment was made as described below. The measurement was carried out at 23° C. and 50% RH.

A: the distance of floating was less than 10 mm B: the distance of floating was 10 mm or more <Transparency>

The haze of the coated film was measured according to JIS K 7136 using a color difference/turbidity measurement apparatus COH-400 (manufactured by Nippon Denshoku Industries Co., Ltd.).

Resin compositions A to H used in Examples A1 to A9 below were prepared by methods described below.

(Resin composition A)

1 mol of m-xylylenediamine (MXDA) was put into a reaction container. The temperature was elevated to 60° C. under nitrogen stream, and 0.88 mol of methyl acrylate (MA) was added dropwise thereto over 1 hour. While methanol produced was distilled away, the temperature was elevated to 165° C., and maintained at 165° C. for 2.5 hours. A corresponding amount of methanol was added dropwise over 1.5 hour so that the solid content concentration became 65%, and it was cooled to 30° C. After that, 1.15 mol of glycidyl methacrylate and a corresponding amount of methanol were fed so that the solid content concentration became 65%, and the mixture was reacted at 60° C. for 5 hours, thereby obtaining a resin composition A.

The obtained resin was subjected to $^1$H-NMR analysis and GPC measurement to confirm the structure of the resin.

(Resin Composition B)

1 mol of m-xylylenediamine was put into a reaction container. The temperature was elevated to 60° C. under nitrogen stream, and 0.90 mol of methyl acrylate was added dropwise thereto over 1 hour. While methanol produced was distilled away, the temperature was elevated to 165° C., and maintained at 165° C. for 2.5 hours. A corresponding amount of methanol was added dropwise over 1.5 hour so that the solid content concentration became 65%, and it was cooled to 30° C. After that, 1.15 mol of glycidyl methacrylate and a corresponding amount of methanol were fed so that the solid content concentration became 65%, and the mixture was reacted at 60° C. for 5 hours, thereby obtaining a resin composition B.

The obtained resin was subjected to $^1$H-NMR analysis and GPC measurement to confirm the structure of the resin.

(Resin Composition C)

1 mol of m-xylylenediamine was put into a reaction container. The temperature was elevated to 60° C. under nitrogen stream, and 0.93 mol of methyl acrylate was added dropwise thereto over 1 hour. While methanol produced was distilled away, the temperature was elevated to 165° C., and maintained at 165° C. for 2.5 hours. A corresponding amount of methanol was added dropwise over 1.5 hour so that the solid content concentration became 65%, and it was cooled to 30° C. After that, 1.15 mol of glycidyl methacrylate and a corresponding amount of methanol were fed so that the solid content concentration became 65%, and the mixture was reacted at 60° C. for 5 hours, thereby obtaining a resin composition C.

The obtained resin was subjected to $^1$H-NMR analysis and GPC measurement to confirm the structure of the resin.

(Resin Composition D)

1 mol of m-xylylenediamine was put into a reaction container. The temperature was elevated to 60° C. under nitrogen stream, and 0.90 mol of methyl acrylate was added dropwise thereto over 1 hour. While methanol produced was distilled away, the temperature was elevated to 165° C., and maintained at 165° C. for 2.5 hours. A corresponding amount of methanol was added dropwise over 1.5 hour so that the solid content concentration became 65%, and it was cooled to 30° C. After that, 0.57 mol of glycidyl methacrylate and a corresponding amount of methanol were fed so that the solid content concentration became 65%, and the mixture was reacted at 60° C. for 5 hours, thereby obtaining a resin composition D.

The obtained resin was subjected to $^1$H-NMR analysis and GPC measurement to confirm the structure of the resin.

(Resin Composition E)

1 mol of m-xylylenediamine was put into a reaction container. The temperature was elevated to 60° C. under nitrogen stream, and 0.88 mol of methyl acrylate was added dropwise thereto over 1 hour. While methanol produced was distilled away, the temperature was elevated to 165° C., and maintained at 165° C. for 2.5 hours. A corresponding amount of methanol was added dropwise over 1.5 hour so that the solid content concentration became 65%, and it was cooled to 30° C. After that, 0.57 mol of glycidyl methacrylate and a corresponding amount of methanol were fed so that the solid content concentration became 65%, and the mixture was reacted at 60° C. for 5 hours, thereby obtaining a resin composition E.

The obtained resin was subjected to $^1$H-NMR analysis and GPC measurement to confirm the structure of the resin.

(Resin Composition F)

1 mol of m-xylylenediamine was put into a reaction container. The temperature was elevated to 60° C. under nitrogen stream, and 0.88 mol of methyl methacrylate was added dropwise thereto over 1 hour. While methanol produced was distilled away, the temperature was elevated to 165° C., and maintained at 165° C. for 2.5 hours. A corresponding amount of methanol was added dropwise over 1.5 hour so that the solid content concentration became 65%, and it was cooled to 30° C. After that, 1.15 mol of glycidyl methacrylate and a corresponding amount of methanol were fed so that the solid content concentration became 65%, and the mixture was reacted at 60° C. for 5 hours, thereby obtaining a resin composition F.

The obtained resin was subjected to $^1$H-NMR analysis and GPC measurement to confirm the structure of the resin.

(Resin Composition G)

1 mol of m-xylylenediamine was put into a reaction container. The temperature was elevated to 60° C. under nitrogen stream, and 0.88 mol of methyl crotonate was added dropwise thereto over 1 hour. While methanol produced was distilled away, the temperature was elevated to 165° C., and maintained at 165° C. for 2.5 hours. A corresponding amount of methanol was added dropwise over 1.5 hour so that the solid content concentration became 65%, and it was cooled to 30° C. After that, 1.15 mol of glycidyl methacrylate and a corresponding amount of methanol were fed so that the solid content concentration became 65%, and the mixture was reacted at 60° C. for 5 hours, thereby obtaining a resin composition G The obtained resin was subjected to $^1$H-NMR analysis and GPC measurement to confirm the structure of the resin.

(Resin Composition H)

1 mol of m-xylylenediamine was put into a reaction container. The temperature was elevated to 60° C. under nitrogen stream, and 0.70 mol of methyl acrylate was added dropwise thereto over 1 hour. While methanol produced was distilled away, the temperature was elevated to 165° C., maintained at 165° C. for 2.5 hours, and then cooled to 60° C. After that, 1 mol of 2-isocyanatoethyl methacrylate was fed, and the mixture was reacted at 60° C. for 2 hours. In addition, a corresponding amount of methanol was added for dilution so that the solid content concentration became 65%, thereby obtaining a resin composition H.

The obtained resin was subjected to $^1$H-NMR analysis and GPC measurement to confirm the structure of the resin.

TABLE 1

| Resin composition | Components | | | Reaction molar ratio | |
|---|---|---|---|---|---|
| | (A) | (B) | (C) | (B)/(A) | (C)/[(A) + (B)] |
| A | MXDA | MA | GMA | 0.88 | 0.61 |
| B | MXDA | MA | GMA | 0.90 | 0.61 |
| C | MXDA | MA | GMA | 0.93 | 0.60 |
| D | MXDA | MA | GMA | 0.90 | 0.30 |
| E | MXDA | MA | GMA | 0.88 | 0.30 |
| F | MXDA | MMA | GMA | 0.88 | 0.61 |
| G | MXDA | MC | GMA | 0.88 | 0.61 |
| H | MXDA | MA | IEMA | 0.70 | 0.59 |

MXDA: m-xylylenediamine
MA: methyl acrylate
MMA: methyl methacrylate
MC: methyl crotonate
GMA: glycidyl methacrylate
IEMA: 2-isocyanatoethyl methacrylate Example A1

Preparation of Resin Solution A

A solution containing 153.8 parts by mass of the resin composition A prepared as described above and 68.42 parts by mass of methanol was prepared. 0.2 parts by mass of a silicone-based defoamer (BYK065 manufactured by BYK-Chemie) was added thereto, and the mixture was stirred well, thereby obtaining a resin solution A.

<Measurement of Oxygen Transmission Coefficient>

The resin solution A prepared as described above was applied to an ester film having a thickness of 12 μm as a base material (E5100 manufactured by Toyobo Co., Ltd.) using a bar coater No. 8 (the application amount: 5.0 g/m$^2$ (solid content)), and it was dried at 85° C. for 30 seconds. After that, the resin composition A was cured with a conveyor-type ultraviolet irradiation apparatus U-0303 (manufactured by GS Yuasa Corporation, using a high-pressure mercury lamp, lamp output: 80 W/cm, conveyor speed: 3 m/min), wherein the ultraviolet radiation dose was set to 540 mJ/cm$^2$, thereby obtaining a sample.

Using the prepared coated film, the oxygen transmission coefficient of the cured product of the resin composition A was obtained according to the above-described method. The results are shown in Table 1.

<Adhesiveness, Pencil Hardness, Curl and Haze>

The resin solution A was applied to an ester film having a thickness of 250 μm as a base material (E5101 manufactured by Toyobo Co., Ltd.) using a bar coater No. 24 (the application amount: 10.0 g/m$^2$ (solid content)), and it was dried at 85° C. for 30 seconds. After that, the resin composition A was cured with a conveyor-type ultraviolet irradiation apparatus U-0303 (manufactured by GS Yuasa Corporation, using a high-pressure mercury lamp, lamp output: 80

W/cm, conveyor speed: 3 m/min), wherein the ultraviolet radiation dose was set to 540 mJ/cm$^2$, thereby obtaining a sample.

Using the prepared coated film, the adhesiveness (cross-cut test), pencil hardness, curl and haze of the resin composition A were measured according to the above-described methods. The results are shown in Table 1.

<Measurement of Laminate Strength>

The resin solution A was applied to a stretched polyester film having a thickness of 12 μm (E5101 manufactured by Toyobo Co., Ltd.) using a bar coater No. 8 (the application amount: 5.0 g/m$^2$ (solid content)), and it was dried at 85° C. for 30 seconds. After that, a linear low-density polyethylene film having a thickness of 40 μm (TUX-MCS manufactured by Mitsui Chemicals Tohcello Inc.) was bonded thereto using a nip roll. Subsequently, it was irradiated with ultraviolet light using a conveyor-type ultraviolet irradiation apparatus U-0303 (manufactured by GS Yuasa Corporation, using a high-pressure mercury lamp, lamp output: 80 W/cm, conveyor speed: 3 m/min), wherein the ultraviolet radiation dose was set to 540 mJ/cm$^2$, thereby obtaining a laminated film. Using the prepared laminated film, the laminate strength was measured according to the above-described method. The results are shown in Table 2.

Example A2

A resin solution B was prepared in a manner similar to that in Example A1, except that a resin composition B was used instead of the resin composition A, and the measurements were carried out in manners similar to those in Example A1. The results are shown in Table 2.

Example A3

A resin solution C was prepared in a manner similar to that in Example A1, except that a resin composition C was used instead of the resin composition A, and the measurements were carried out in manners similar to those in Example A1. The results are shown in Table 2.

Example A4

A resin solution D was prepared in a manner similar to that in Example A1, except that a resin composition D was used instead of the resin composition A, and the measurements were carried out in manners similar to those in Example A1. The results are shown in Table 2.

Example A5

A resin solution E was prepared in a manner similar to that in Example A1, except that a resin composition E was used instead of the resin composition A, and the measurements were carried out in manners similar to those in Example A1. The results are shown in Table 2.

Example A6

A solution containing 100.0 parts by mass of the resin composition E, 17.4 parts by mass of an epoxy resin having a glycidylamino group induced from m-xylylenediamine (TETRAD-X manufactured by Mitsubishi Gas Chemical Company, Inc.) and 65.71 parts by mass of methanol was prepared. 0.2 parts by mass of a silicone-based defoamer (BYK065 manufactured by BYK-Chemie) was added thereto, and the mixture was stirred well, thereby obtaining a resin solution F.

The measurements were carried out in manners similar to those in Example A1, except that the above-described resin solution F was used instead of the resin solution A. The results are shown in Table 2.

Example A7

A resin solution G was prepared in a manner similar to that in Example A1, except that a resin composition F was used instead of the resin composition A, and the measurements were carried out in manners similar to those in Example A1. The results are shown in Table 2.

Example A8

A resin solution H was prepared in a manner similar to that in Example A1, except that a resin composition G was used instead of the resin composition A, and the measurements were carried out in manners similar to those in Example A1. The results are shown in Table 2.

Example A9

A resin solution I was prepared in a manner similar to that in Example A1, except that a resin composition H was used instead of the resin composition A, and the measurements were carried out in manners similar to those in Example A1. The results are shown in Table 2.

Comparative Example A1

A solution containing 100 parts by weight of UV-7600B (ultraviolet curable urethane acrylate resin manufactured by The Nippon Synthetic Chemical Industry Co., Ltd., containing 4 phr of a photopolymerization initiator) and 100 parts by mass of ethyl acetate was prepared, thereby obtaining a resin solution J.

The measurements were carried out in manners similar to those in Example A1, except that the resin solution J was used instead of the resin solution A. The results are shown in Table 2.

TABLE 2

| | Oxygen transmission coefficient (ml · mm/m$^2$ · day · MPa) | Adhesiveness | Pencil hardness | Curl | Haze | Laminate strength (g/15 mm) |
|---|---|---|---|---|---|---|
| Example A1 | 0.47 | 25/25 | 4H | A | 2.8 | 700 |
| Example A2 | 0.54 | 25/25 | 4H | A | 3.0 | 700 |
| Example A3 | 0.63 | 25/25 | 4H | A | 3.1 | 700 |
| Example A4 | 1.05 | 25/25 | 2H | A | 3.1 | 700 |
| Example A5 | 0.71 | 25/25 | 2H | A | 2.9 | 700 |
| Example A6 | 0.51 | 20/25 | 2H | A | 2.8 | 600 |
| Example A7 | 1.85 | 25/25 | 4H | A | 3.0 | 700 |
| Example A8 | 1.80 | 25/25 | 4H | A | 2.9 | 700 |
| Example A9 | 0.80 | 25/25 | 3H | A | 3.1 | 700 |
| Comparative Example A1 | >100 | 14/25 | 5H | B | 3.6 | 100 |

The resin explained above is an active-energy-ray-curable resin having excellent transparency and workability, wherein the heat treatment at a high temperature is not required. Excellent gas barrier properties are exerted by curing of the above-described resin or resin composition.

For this reason, the resin is utilized in a wide range of industrial fields including coating materials for corrosion proof and beautification, packaging materials for foods, pharmaceutical products, etc. for which high gas barrier properties are required, and electronic components. In particular, the resin can be suitably used as coat materials or adhesives for various gas-permeable base materials, for example, films or sheets made of plastics such as polyolefin, polyester and polyamide used for packaging materials for foods, pharmaceutical products, etc.

Second Embodiment

Gas Barrier Laminate

In one embodiment, the gas barrier laminate of the present invention (hereinafter sometimes referred to as "laminated film" or "coated film") comprises a base material layer and at least one gas barrier layer, and the gas barrier layer is formed by curing of the resin described in the first embodiment above.

[Layer Structure of Laminate]

The base material layer may consist of one layer or two or more layers. It is preferred that at least one surface of each of the respective layers of the base material layer directly contacts with the gas barrier layer (G).

Further, the gas barrier laminate of the present invention may be used directly or used by further laminating other layers thereon.

Firstly, the case where the gas barrier layer containing the cured product of the resin described in the first embodiment above is used as a coat layer arranged at the outermost position of the laminate will be explained (hereinafter, the gas barrier laminate of this embodiment is also referred to as "gas barrier coated film").

In one embodiment, in the gas barrier laminate of the present invention, the gas barrier layer is arranged on at least one laminate surface of the gas barrier laminate. The matter "arranged on at least one laminate surface" includes the case where the gas barrier layer is arranged on both the front surface and the back surface of the laminate and the case where the gas barrier layer is arranged on the front surface or the back surface of the laminate.

[Layer Structure of Gas Barrier Coated Film]

The base material layer is at least one type of layer selected from a flexible polymer film layer (F), a paper layer (P) and a metal foil layer (M). It is preferred that at least one surface of said at least one type of layer selected from the flexible polymer film layer (F), the paper layer (P) and the metal foil layer (M) directly contacts with the gas barrier layer (G). The flexible polymer film layer (F), the paper layer (P) and the metal foil layer (M) can be arbitrarily selected according to intended use thereof, and a combination of these layers can also be employed. Examples of the structure of the gas barrier coated film of the present invention include (G)/(F), (G)/(F)/(G), (G)/(P), (G)/(P)/(G), (G)/(M), (G)/(M)/(G), (G)/(F)/(M), (G)/(F)/(P), (G)/(P)/(F), (G)/(P)/(M), (G)/(M)/(F) and (G)/(M)/(P), but the structure is not limited thereto. Moreover, an oxygen absorption layer, an adhesive layer, an anchor coat layer, etc. may be included.

[Flexible Polymer Film Layer (F)]

As the flexible polymer film, any flexible polymer film can be used as long as it can retain the gas barrier layer. Examples thereof include polyolefin-based films of low-density polyethylene, high-density polyethylene, linear low-density polyethylene, polypropylene, etc., polyester-based films of polyethylene terephthalate, polybutylene terephthalate, etc., polyamide-based films of Nylon 6, Nylon 6,6, m-xylene adipamide (N-MXD6), etc., biodegradable films of polylactic acid, etc., polyacrylonitrile-based films, poly (meth)acrylic films, polystyrene-based films, polycarbonate-based films, ethylene-vinyl acetate copolymer saponified product (EVOH)-based films, and polyvinyl alcohol-based films. Among them, polyolefin-based films, polyester-based films and polyamide-based films are preferred.

Further, it is possible to use films obtained by coating these materials with any of various polymers such as polyvinylidene chloride (PVDC) resin, polyvinyl alcohol resin, ethylene-vinyl acetate copolymer saponified product-based resin and acrylic resin, films obtained by vapor deposition of any of various inorganic compounds or metals such as silica, alumina and aluminium on the materials, films obtained by dispersing an inorganic filler or the like in the materials, films to which oxygen trapping function is imparted, etc.

Moreover, it is also possible to disperse an inorganic filler in the various polymers to be used for coating. Examples of the inorganic filler include silica, alumina, mica, talc, aluminum flake and glass flake, but a layered silicate such as montmorillonite is preferred. As a method for dispersing the inorganic filler, conventionally known methods such as an extrusion/kneading method and a method of mixing and dispersion in a resin solution can be used. Examples of methods for imparting oxygen trapping function include a method of at least partially using a composition comprising a low-molecular organic compound which reacts with oxygen such as hindered phenols, vitamin C, vitamin E, organic phosphorus compounds, gallic acid and pyrogallol, a compound of a transition metal such as cobalt, manganese, nickel, iron and copper or the like.

The thickness of the above-described film material is preferably 10 µm to 300 µm, more preferably 10 µm to 100 µm, and particularly preferably 10 µm to 50 µm from a practical viewpoint. Further, the above-described film may be uniaxially or biaxially stretched.

The surface of these film materials is desirably subjected to various surface treatments such as the flame treatment and the corona discharge treatment according to need so that a gas barrier layer without defects such as film break and eye hole is formed. These treatments promote good adhesion of the gas barrier layer to the various film materials. In addition, after the surface of the film material is subjected to an appropriate surface treatment, a printing layer may be provided thereon according to need. When providing the printing layer, general printing apparatuses used for printing on conventional polymer films such as gravure printing machines, flexographic printing machines and offset printing machines can be similarly employed. Further, regarding an ink for forming the printing layer, inks used for printing layers of conventional polymer films, which are formed by using a pigment such as an azo-based pigment and a phthalocyanine-based pigment, a resin such as rosin, polyamide resin and polyurethane, a solvent such as methanol, ethyl acetate and methyl ethyl ketone, etc., can be similarly employed.

[Paper Layer (P)]

As the paper layer (P), since it may be used as a base material constituting a paper container, materials having shapability, flex resistance, rigidity, elasticity, strength, etc. can be used. For example, various paper base materials such as bleached or unbleached paper base materials; white rolled paper, kraft paper, paperboard, processed paper, etc. and recycled paper thereof; calcium carbonate paper; and aluminium hydroxide paper can be used.

As the above-described paper base materials, those having a basis weight of about 40 to 600 g/m², and preferably those having a basis weight of about 50 to 500 g/m² can be used. Note that desired printed patterns such as characters, figures, pictures and symbols can be arbitrarily formed on the above-described paper base materials by a usual printing method.

[Metal Foil Layer (M)]

The metal foil layer (M) is not particularly limited as long as it is a foil made of a metal having excellent ductility such as gold, silver, copper, zinc, iron, lead, tin and an alloy thereof, steel, stainless steel and aluminium, but industrially, an aluminium foil is a particularly suitable metal foil. In general, the thickness of the metal foil is preferably 4 to 50 µm.

A primer (medium) layer may be formed between the base material layer and the gas barrier layer. In this case, primers with various chemical structures can be used both in the cases of one-liquid type and two-liquid type as long as adhesiveness to the base material is provided. Polyester-based primers, in which permeability of alcohols such as methanol suitably used as the main solvent of adhesives is low, are practical and therefore preferred.

The thickness of the primer layer is preferably 0.01 µm to 20 µm from a practical viewpoint. It is more preferably 0.05 µm to 5 µm, and particularly preferably 0.1 µm to 3.0 µm. When the thickness is within this range, sufficient adhesiveness is easily provided, and it is easy to form a primer layer having a uniform thickness.

[Gas Barrier Layer (G)]

The gas barrier layer (G) is formed by curing of the active-energy-ray-curable resin described in the first embodiment above.

[Active-Energy-Ray-Curable Resin and Preparation Method Thereof]

The active-energy-ray-curable resin to be used and the preparation method thereof are as described in the first embodiment above.

The active-energy-ray-curable resin may be used in a resin composition. The components contained in the resin composition, the contents thereof, etc., are as described in the first embodiment above.

[Curing of Active-Energy-Ray-Curable Resin]

The method for curing the active-energy-ray-curable resin with active energy ray is as described in the first embodiment above.

The oxygen transmission coefficient of the gas barrier layer obtained is preferably 2.0 ml·mm/m²·day·MPa (23° C., 60% RH) or less. It is more preferably 1.9 or less, and particularly preferably 1.8 or less.

The measurement of the oxygen transmission coefficient is carried out according to the method described in Example B below.

Example B

Hereinafter, the above-described second embodiment will be specifically described by way of examples. However, the present invention is not limited by these examples.

The methods for evaluating performances of the gas barrier coated film (oxygen transmission coefficient, adhesiveness (cross-cut test), pencil hardness, curl and transparency) are as described in Example A of the first embodiment above.

Resin compositions A to H used in Examples B1 to B9 below were prepared as described in Example A of the first embodiment above.

TABLE 3

| Resin composition | Components | | | Reaction molar ratio | |
|---|---|---|---|---|---|
| | (A) | (B) | (C) | (B)/(A) | (C)/[(A) + (B)] |
| A | MXDA | MA | GMA | 0.88 | 0.61 |
| B | MXDA | MA | GMA | 0.90 | 0.61 |
| C | MXDA | MA | GMA | 0.93 | 0.60 |
| D | MXDA | MA | GMA | 0.90 | 0.30 |
| E | MXDA | MA | GMA | 0.88 | 0.30 |
| F | MXDA | MMA | GMA | 0.88 | 0.61 |
| G | MXDA | MC | GMA | 0.88 | 0.61 |
| H | MXDA | MA | IEMA | 0.70 | 0.59 |

MXDA: m-xylylenediamine
MA: methyl acrylate
MMA: methyl methacrylate
MC: methyl crotonate
GMA: glycidyl methacrylate
IEMA: 2-isocyanatoethyl methacrylate Example B1

Preparation of Coated Film (for Measurement of Oxygen Transmission Coefficient)

A solution containing 153.8 parts by mass of the resin composition A and 68.42 parts by mass of methanol was prepared. 0.2 parts by mass of a silicone-based defoamer (BYK065 manufactured by BYK-Chemie) was added thereto, and the mixture was stirred well, thereby obtaining a resin solution A.

The resin solution A was applied to a polyester film having a thickness of 12 µm as a base material (E5100 manufactured by Toyobo Co., Ltd.) using a bar coater No. 8 (the application amount: 5.0 g/m² (solid content)), and it was dried at 85° C. for 30 seconds. After that, the resin composition A was cured with a conveyor-type ultraviolet irradiation apparatus U-0303 (manufactured by GS Yuasa Corporation, using a high-pressure mercury lamp, lamp output: 80 W/cm, conveyor speed: 3 m/min), wherein the ultraviolet radiation dose was set to 540 mJ/cm², thereby obtaining a sample.

Using the prepared coated film, the oxygen transmission coefficient of the cured product of the resin composition A was obtained according to the above-described method. The results are shown in Table 4.

<Preparation of Coated Film (for Measurement of Adhesiveness, Pencil Hardness and Curl)>

The resin solution A prepared as described above was applied to a polyester film having a thickness of 250 µm as a base material (E5101 manufactured by Toyobo Co., Ltd.) using a bar coater No. 24 (the application amount: 10.0 g/m² (solid content)), and it was dried at 85° C. for 30 seconds. After that, the resin composition A was cured with a conveyor-type ultraviolet irradiation apparatus U-0303 (manufactured by GS Yuasa Corporation, using a high-pressure mercury lamp, lamp output: 80 W/cm, conveyor speed: 3 m/min), wherein the ultraviolet radiation dose was set to 540 mJ/cm², thereby obtaining a sample.

Using the prepared coated film, the adhesiveness (cross-cut test), pencil hardness and curl of the resin composition A were measured according to the above-described methods. The results are shown in Table 4.

Example B2

A resin solution B was prepared in a manner similar to that in Example B1, except that a resin composition B was used instead of the resin composition A, and the measurements were carried out in manners similar to those in Example B1. The results are shown in Table 4.

Example B3

A resin solution C was prepared in a manner similar to that in Example B1, except that a resin composition C was used instead of the resin composition A, and the measurements were carried out in manners similar to those in Example B1. The results are shown in Table 4.

Example B4

A resin solution D was prepared in a manner similar to that in Example B1, except that a resin composition D was used instead of the resin composition A, and the measurements were carried out in manners similar to those in Example B1. The results are shown in Table 4.

Example B5

A resin solution E was prepared in a manner similar to that in Example B1, except that a resin composition E was used instead of the resin composition A, and the measurements were carried out in manners similar to those in Example B1. The results are shown in Table 4.

Example B6

A solution containing 100.0 parts by mass of the resin composition E, 17.4 parts by mass of an epoxy resin having a glycidylamino group induced from m-xylylenediamine (TETRAD-X manufactured by Mitsubishi Gas Chemical Company, Inc.) and 65.71 parts by mass of methanol was prepared. 0.2 parts by mass of a silicone-based defoamer (BYK065 manufactured by BYK-Chemie) was added thereto, and the mixture was stirred well, thereby obtaining a resin solution F.

The measurements were carried out in manners similar to those in Example B1, except that the above-described resin solution F was used instead of the resin solution A. The results are shown in Table 4.

Example B7

A resin solution G was prepared in a manner similar to that in Example B1, except that a resin composition F was used instead of the resin composition A, and the measurements were carried out in manners similar to those in Example B1. The results are shown in Table 4.

Example B8

A resin solution H was prepared in a manner similar to that in Example B1, except that a resin composition G was used instead of the resin composition A, and the measurements were carried out in manners similar to those in Example B1. The results are shown in Table 4.

Example B9

A resin solution I was prepared in a manner similar to that in Example B1, except that a resin composition H was used instead of the resin composition A, and the measurements were carried out in manners similar to those in Example B1. The results are shown in Table 4.

Example B10

Preparation of Coated Film (for Measurement of Oxygen Transmission Coefficient)

A urethane adhesive (TM-319/CAT-19B manufactured by Toyo-Morton, Ltd.) was applied to a polyester film having a thickness of 12 µm (E5100 manufactured by Toyobo Co., Ltd.) using a bar coater No. 8 (the application amount: 3.0 g/m$^2$ (solid content)), and it was dried at 85° C. for 30 seconds. After that, an aluminum foil having a thickness of 7 µm (1N30 manufactured by Mitsubishi Aluminum Co., Ltd.) was bonded thereto using a nip roll. The resin solution A was applied to the aluminum foil surface of the base material using a bar coater No. 8 (the application amount: 3.0 g/m$^2$ (solid content)), and it was dried at 85° C. for 30 seconds. After that, the resin composition A was cured with a conveyor-type ultraviolet irradiation apparatus U-0303 (manufactured by GS Yuasa Corporation, using a high-pressure mercury lamp, lamp output: 80 W/cm, conveyor speed: 3 m/min), wherein the ultraviolet radiation dose was set to 540 mJ/cm$^2$, thereby obtaining a sample.

Using the prepared coated film, the oxygen transmission coefficient of the cured product of the resin composition A was obtained according to the above-described method. The results are shown in Table 4.

<Preparation of Coated Film (for Measurement of Adhesiveness, Pencil Hardness and Curl)>

A urethane adhesive (TM-319/CAT-19B manufactured by Toyo-Morton, Ltd.) was applied to a polyester film having a thickness of 250 µm (E5101 manufactured by Toyobo Co., Ltd.) using a bar coater No. 8 (the application amount: 3.0 g/m$^2$ (solid content)), and it was dried at 85° C. for 30 seconds. After that, an aluminum foil having a thickness of 7 µm (1N30 manufactured by Mitsubishi Aluminum Co., Ltd.) was bonded thereto using a nip roll. The resin solution A was applied to the aluminum foil surface of the base material prepared using a bar coater No. 24 (the application amount: 10.0 g/m$^2$ (solid content)), and it was dried at 85° C. for 30 seconds. After that, the resin composition A was cured with a conveyor-type ultraviolet irradiation apparatus U-0303 (manufactured by GS Yuasa Corporation, using a high-pressure mercury lamp, lamp output: 80 W/cm, conveyor speed: 3 in/min), wherein the ultraviolet radiation dose was set to 540 mJ/cm$^2$, thereby obtaining a sample.

Using the prepared coated film, the adhesiveness (cross-cut test), pencil hardness and curl of the resin composition A were measured according to the above-described methods. The results are shown in Table 4.

Comparative Example B1

A solution containing 100 parts by weight of UV-7600B (ultraviolet curable urethane acrylate resin manufactured by The Nippon Synthetic Chemical Industry Co., Ltd., containing 4 phr of a photopolymerization initiator) and 100 parts by mass of ethyl acetate was prepared, thereby obtaining a resin solution J.

The measurements were carried out in manners similar to those in Example B1, except that the resin solution J was used instead of the resin solution A. The results are shown in Table 4.

TABLE 4

| | Oxygen transmission coefficient (ml·mm/m²·day·MPa) | Adhesiveness | Pencil hardness | Curl |
|---|---|---|---|---|
| Example B1 | 0.47 | 25/25 | 4H | A |
| Example B2 | 0.54 | 25/25 | 4H | A |
| Example B3 | 0.63 | 25/25 | 4H | A |
| Example B4 | 1.05 | 25/25 | 2H | A |
| Example B5 | 0.71 | 25/25 | 2H | A |
| Example B6 | 0.51 | 20/25 | 2H | A |
| Example B7 | 1.85 | 25/25 | 4H | A |
| Example B8 | 1.80 | 25/25 | 4H | A |
| Example B9 | 0.80 | 25/25 | 3H | A |
| Example B10 | 0.47 | 20/25 | 4H | A |
| Comparative Example B1 | >100 | 14/25 | 5H | B |

The gas barrier coated film explained above is a film obtained by using the active-energy-ray-curable resin having excellent transparency and workability, wherein the heat treatment at a high temperature is not required. Excellent gas barrier properties are exerted by the gas barrier coated film explained above by curing of the resin. For this reason, the gas barrier coated film is utilized in a wide range of industrial fields, in which high gas barrier properties are required, including packaging materials for foods, pharmaceutical products, etc. and electronic components. In particular, the gas barrier coated film can be suitably used as various gas-permeable base materials, for example, coat materials for films or sheets made of plastics such as polyolefin, polyester and polyamide used for packaging materials for foods, pharmaceutical products, etc.

Third Embodiment

Next, the case where the gas barrier layer containing the cured product of the resin described in the first embodiment above is used for bonding two or more base material layers will be explained.

In one embodiment, the gas barrier laminate of the present invention has two or more base material layers, and the gas barrier layer is arranged between any two of the base material layers (hereinafter, the gas barrier laminate in this embodiment is also referred to as "laminated film"). Specifically, the gas barrier layer may be used as an adhesive (hereinafter, the gas barrier layer in this embodiment is also referred to as "adhesive layer"). Between the gas barrier layer and the base material layer, other layers may further exist.

The base material layers constituting the gas barrier laminate can be arbitrarily selected according to intended use thereof. Examples thereof include a flexible polymer film layer (F), a paper layer (P) and a metal foil layer (M), and a combination thereof can also be employed. When laminating layers constituting the gas barrier laminate, at least one layer is an adhesive layer (gas barrier layer; G) formed by curing of the active-energy-ray-curable resin described in the first embodiment above. Regarding adhesive layers other than the adhesive layer formed by curing of the active-energy-ray-curable resin, other adhesives such as polyurethane-based adhesives may be used, or resins may be welded. Further, the gas barrier layer formed by curing of the active-energy-ray-curable resin may also be used as a coat layer (specifically, a layer arranged on the surface of the laminate). Examples of the structure of the gas barrier laminate include (F)/(G)/(F), (F)/(G)/(F)/(G)/(F), (F)/(G)/(P)/(G)/(F), (F)/(G)/(P), (F)/(G)/(M)/(G)/(P), (P)/(G)/(M), (P)/(G)/(F)/(G)/(M), (G)/(F)/(G)/(P) and (G)/(F)/(G)/(F)/(G), but the structure is not limited thereto. Moreover, an oxygen absorption layer, an adhesive layer, an anchor coat layer, etc. may be included.

As described above, it is sufficient when at least one layer in the gas barrier laminate is the adhesive layer (gas barrier layer) consisting of the cured product of the active-energy-ray-curable resin, and other layers can be suitably selected from various materials to be used as the base material layer. Examples of the structure include three-layer structures such as polyester layer/active-energy-ray-curable resin layer (gas barrier layer)/polyolefin layer and polyamide layer/active-energy-ray-curable resin layer (gas barrier layer)/polyolefin layer, and four-layer structures such as polyester layer/active-energy-ray-curable resin layer (gas barrier layer)/polyurethane-based adhesive layer/polyolefin layer and polyamide layer/active-energy-ray-curable resin layer (gas barrier layer)/polyurethane-based adhesive layer/polyolefin layer, but the structure is not limited thereto. Hereinafter, the respective base material layers will be described in detail.

[Flexible Polymer Film Layer (F)]

The flexible polymer film layer constituting the gas barrier laminate of the present invention can be classified into a base material film layer for holding the gas barrier layer, a sealant layer which functions as a heat-seal region at the time of forming a packaging material, etc. from the viewpoint of the role thereof. Performances such as strength and melting point required for these film layers vary depending on the roles thereof.

As the flexible polymer film which functions as the base material film layer, materials similar to those described in the second embodiment above can be used.

The flexible polymer film which functions as the sealant layer can be similarly selected from the film materials mentioned in the explanation about the flexible polymer film which functions as the base material film layer above. However, in consideration of exertion of good heat-seal properties, it is preferred to select a polyolefin-based film such as a polyethylene film, polypropylene film and ethylene-vinyl acetate copolymer. The thickness of the film is preferably 10 μm to 300 μm, more preferably 12 μm to 250 μm, and particularly preferably 15 μm to 200 μm from a practical viewpoint. Further, the surface of the film may be subjected to various surface treatments such as the flame treatment and the corona discharge treatment.

[Paper Layer (P)]

As the paper layer (P), materials similar to those described in the second embodiment above can be used.

[Metal Foil Layer (M)]

As the metal foil layer (M), materials similar to those described in the second embodiment above can be used. Further, similarly, a primer layer may be formed on the resin-applied surface.

[Gas Barrier Layer (G)]

The gas barrier layer (G) is formed by curing of the active-energy-ray-curable resin described in the first embodiment above.

[Active-Energy-Ray-Curable Resin and Preparation Method Thereof]

The active-energy-ray-curable resin to be used and the preparation method thereof are as described in the first embodiment above except for matters specifically described below. The same applies to the method for curing the resin.

The oxygen transmission coefficient of the gas barrier layer obtained is preferably 2.0 ml·mm/m²·day·MPa (23° C., 60% RH) or less. It is more preferably 1.9 or less, and particularly preferably 1.8 or less.

The measurement of the oxygen transmission coefficient is carried out according to the method described in Example C below.

[Production of Laminate]

When laminating various film materials using the active-energy-ray-curable resin, it is possible to use a publicly-known lamination method such as dry lamination, non-solvent lamination and extrusion lamination. In the present invention, dry lamination or extrusion lamination is preferred.

When the active-energy-ray-curable resin composition is applied to various materials to be laminated, it is carried out at a concentration of the resin composition and a temperature which are sufficient for obtaining the cured product as the gas barrier layer, but this can be changed based on the selection of raw materials and lamination methods. Specifically, the concentration of the resin composition may vary in various cases, including the case where no solvent is used and the case where an application liquid (adhesive solution) is prepared by diluting the composition with an appropriate organic solvent and/or water to have a composition concentration of about 5% by weight, depending on types and molar ratios of selected materials and a lamination method selected. As the organic solvent, any solvent which dissolves the resin composition can be used.

The above-described application liquid (adhesive solution) obtained by dilution with the solvent may have a concentration which provides a Zahn cup (No. 3) viscosity thereof in the range of 5 to 30 seconds (25° C.). When the Zahn cup (No. 3) viscosity is less than 5 seconds, the resin composition is not applied to a product to be coated sufficiently, and it may cause roll contamination and the like. Further, when the Zahn cup (No. 3) viscosity exceeds 30 seconds, the resin composition does not move to a roll sufficiently and it is difficult to form a homogeneous gas barrier layer. For example, in the case of dry lamination, the Zahn cup (No. 3) viscosity during use thereof is preferably 10 to 45 seconds (25° C.), and more preferably 10 to 30 seconds.

When using the solvent, the temperature for drying the solvent after application may be in the range of 20 to 140° C., but a temperature near the boiling point of the solvent, which does not affect a coated product, is desirable. When the drying temperature is lower than 20° C., the solvent remains in the laminated film and it may cause adhesion failure and odor. When the drying temperature is higher than 140° C., it is difficult to obtain a laminated film having good outer appearance due to softening of a polymer film or the like. For example, when applying the resin composition to a stretched polypropylene film, the drying temperature is desirably 40 to 120° C.

As the style of coating at the time of application, any of generally-used coating styles such as roll coating, spray coating, air knife coating, immersion and brush coating may be used. Roll coating or spray coating is preferred. For example, a roll coat or spray technique and equipment similar to those used for applying a polyurethane-based adhesive component to a polymer film to be laminated may be employed.

Next, specific operations in lamination methods will be described. In the case of the dry lamination method, an application liquid (adhesive solution) is applied to a film material by a roll method such as a gravure roll method. After that, a solvent is dried and immediately a new film material is bonded to the surface thereof using a nip roll, thereby obtaining a laminated film.

The solvent for preparing the application liquid (adhesive solution) is not particularly limited, but it is preferably a solvent having good solubility and a comparatively low boiling point and comprising an alcohol having 3 carbon atoms or less. Examples thereof include a solvent containing at least one selected from the group consisting of methanol, ethanol, isopropanol and n-propanol as the main component.

In the dry lamination method, it is also possible to apply an application liquid (adhesive solution) to a sealant layer. The application liquid is applied to a polyolefin-based film such as a polyethylene film, a polypropylene film and an ethylene-vinyl acetate copolymer and it is dried, and then a base material such as a stretched polypropylene, a polyamide-based film and a polyethylene terephthalate film is bonded thereto using a nip roll, thereby producing a laminated film.

In the case of the non-solvent lamination method, an application liquid is applied to a film material by a roll such as a gravure roll, and immediately a new film material is bonded to the surface thereof, thereby obtaining a laminated film.

In the case of the extrusion lamination method, a diluted solution of an application liquid as an adhesion assisting agent (anchor coat agent) is applied to a film material by a roll such as a gravure roll, and it is dried at 20 to 140° C. and subjected to a curing reaction. After that, a melted polymer material is laminated using an extruder, thereby obtaining a laminated film. As the polymer material to be melted, a polyolefin-based resin such as a low-density polyethylene resin, a linear low-density polyethylene resin, a polypropylene resin and an ethylene-vinyl acetate copolymer resin is preferably used.

These lamination methods and other generally-used lamination methods can be used in combination according to need, and the layer structure of the laminated film can be changed according to its intended use or form.

The thickness of the gas barrier layer after the application of the application liquid (adhesive solution) to any of various materials, drying thereof, bonding and the curing treatment is preferably from 0.1 to 100 μm from a practical viewpoint. When the thickness is within this range, sufficient gas barrier properties and adhesiveness can be ensured, and a gas barrier layer having a uniform thickness can be formed. The thickness is more preferably from 0.3 to 20 μm, and even more preferably from 0.5 to 10 μm.

[Multilayer Packaging Material]

The laminated film produced by using the above-described application liquid (adhesive solution) can be used as a multilayer packaging material for protecting foods, pharmaceutical products, etc. The multilayer packaging material includes a laminated film. In the case of use as the multilayer packaging material, the layer structure thereof can be changed according to a product to be contained, usage environment, the form of use, etc. Specifically, the laminated film (gas barrier laminate) of the present invention can be directly used as the multilayer packaging material, and alternatively, an oxygen absorption layer or the like can be further laminated on the laminated film according to need. In this case, the above-described application liquid may be used for lamination, and alternatively, another adhesive or anchor coat agent may be used for lamination.

[Bag for Packaging]

The bag for packaging including a soft bag for packaging, etc. produced by using the multilayer packaging material will be described below. The bag for packaging including a soft bag for packaging, etc. can be produced by using the multilayer packaging material, positioning the surfaces of the heat sealable resin layer thereof to be opposed and overlapped, and then heat-sealing the peripheral edge thereof to form a seal portion. Examples of the bag production method include a method in which the multilayer packaging material is folded or overlapped with the inner surfaces thereof being opposed to each other and then the peripheral edge thereof is heat-sealed, for example, by a heat-sealing form such as a side surface seal type, a two sided seal type, a three sided seal type, a four sided seal type, an envelope-like seamed seal type, a butt-seamed seal type (pillow seal type), a corrugated seal type, a flat bottom seal type, a square bottom seal type and a gusset type.

The bag for packaging may be in any of various forms according to a product to be contained therein, usage environment and the form of use. In addition, for example, it may be in the form of a self-supported bag for packaging (standing pouch) or the like. Examples of the heat-seal method include publicly-known methods such as bar seal, rotation roll seal, belt seal, impulse seal, high frequency seal and ultrasonic seal.

A content is put into the bag for packaging from the opening thereof, and after that, the opening is heat-sealed, thereby producing a packaged product in which the above-described bag for packaging is used. Examples of contents which can be put into the bag for packaging include: confectioneries such as rice confectioneries, bean confectioneries, nuts, biscuits/cookies, wafers, marshmallows, pies, semi-baked cakes, candies and snack confectioneries; staples such as breads, snack noodles, instant noodles, dried noodles, pastas, sterile packaged rice, rice porridges containing vegetables or the like, watery cooked rice, packaged rice cakes and cereal foods; processed agricultural products such as pickles, cooked beans, natto (fermented soybeans), miso (soybean paste), shimidofu (frozen soybean curd), tofu (soybean curd), enoki mushroom, konnyaku (paste made from konjak flour), processed edible wild plants, jams, peanut cream, salads, frozen vegetables and processed potatoes; processed animal foods such as hams, bacons, sausages, processed chicken products and corned beef; processed seafood products such as fish hams/sausages, seafood paste products, kamaboko (boiled fish paste), seaweed, preservable foods boiled down in soy sauce, dried bonito, salted fish guts, smoked salmon and karashimentaiko (spicy seasoned cod roe); flesh of fruits such as peach, mandarin orange, pineapple, apple, pear and cherry; vegetables such as corn, asparagus, mushroom, onion, carrot, radish and potato; frozen side dishes typified by hamburger, meatball, fishery fried foods, gyoza (dumpling), croquette, etc.; cooked foods such as chilled side dishes; dairy products such as butter, margarine, cheese, cream, instant creamy powder and formulated milk powder for infants; and other foods such as liquid seasonings, retort-pouch curry and pet foods. In addition, the bag for packaging can also be used as a packaging material for tobaccos, disposable heating pads, pharmaceutical products, cosmetics, etc.

Example C

Hereinafter, the above-described third embodiment will be specifically described by way of examples. However, the present invention is not limited by these examples.

The methods for evaluating performances of the gas barrier laminate are as described below.

<Oxygen Transmission Coefficient (ml·Mm/m$^2$·day·MPa)>

The oxygen transmission rates of a laminate (laminated film), which was prepared by applying a resin composition to a base material, bonding a sealant film thereto and then curing the resin composition according to the method described in the Examples and Comparative Examples, the base material and the sealant film itself were measured using an oxygen transmission rate measurement apparatus (OX-TRAN2/21 manufactured by Modern Control) under conditions of 23° C. and 60% RH. The oxygen transmission coefficient of the cured product of the resin composition (gas barrier layer) was calculated using the following formula:

$$1/R_1 = 1/R_2 + DFT/P + 1/R_3$$

In this regard:
$R_1$: oxygen transmission rate of laminate (laminated film) (ml/m$^2$·day·MPa)
$R_2$: oxygen transmission rate of base material (ml/m$^2$·day·MPa) (in Example C8, oxygen transmission rate of base material composed of three layers (polyester film layer/urethane adhesive layer/aluminium foil layer))
$R_3$: oxygen transmission rate of sealant film (ml/m$^2$·day·MPa)
DFT: thickness of cured product of resin composition (gas barrier layer) (mm)
P: oxygen transmission coefficient of cured product of resin composition (gas barrier layer)

Note that in Example C7, the oxygen transmission coefficient of the cured product of the resin composition (gas barrier layer) was calculated using the following formula:

$$1/R_1 = 1/R_2 + DFT/P + 1/R_3 + 1/R_4$$

In this regard:
$R_1$: oxygen transmission rate of laminate (laminated film) (ml/m$^2$·day·MPa)
$R_2$: oxygen transmission rate of base material (ml/m$^2$·day·MPa)
$R_3$: oxygen transmission rate of sealant film (ml/m$^2$·day·MPa)
$R_4$: oxygen transmission rate of urethane adhesive layer (ml/m$^2$·day·MPa)
DFT: thickness of cured product of resin composition (gas barrier layer) (mm)
P: oxygen transmission coefficient of cured product of resin composition (gas barrier layer)

<Laminate Strength>

Using the method specified by JIS K-6854, the laminate strength (g/15 mm) of a laminated film prepared according to the method described in the Examples was measured by the T-type peeling test at a peel rate of 300 mm/min.

In Examples C1 to C8 below, the resin compositions A and E to H in Example A of the first embodiment above were used.

TABLE 5

| Resin composition | Components | | | Reaction molar ratio | |
|---|---|---|---|---|---|
| | (A) | (B) | (C) | (B)/(A) | (C)/[(A) + (B)] |
| A | MXDA | MA | GMA | 0.88 | 0.61 |
| E | MXDA | MA | GMA | 0.88 | 0.30 |
| F | MXDA | MMA | GMA | 0.88 | 0.61 |
| G | MXDA | MC | GMA | 0.88 | 0.61 |
| H | MXDA | MA | IEMA | 0.70 | 0.59 |

MXDA: m-xylylenediamine
MA: methyl acrylate
MMA: methyl methacrylate
MC: methyl crotonate
GMA: glycidyl methacrylate
IEMA: 2-isocyanatoethyl methacrylate

Example C1

Preparation of Adhesive Solution a

A solution containing 153.8 parts by mass of the resin composition A and 68.42 parts by mass of methanol was prepared. 0.2 parts by mass of a silicone-based defoamer (BYK065 manufactured by BYK-Chemie) was added thereto, and the mixture was stirred well, thereby obtaining an adhesive solution a.

<Preparation of Laminated Film>

The adhesive solution a was applied to a stretched polyester film having a thickness of 12 μm (E5101 manufactured by Toyobo Co., Ltd.) using a bar coater No. 8 (the application amount: 5.0 g/m$^2$ (solid content)), and it was dried at 85° C. for 30 seconds. After that, a linear low-density polyethylene film having a thickness of 40 μm (TUX-MCS manufactured by Mitsui Chemicals Tohcello Inc.) was bonded thereto using a nip roll. Subsequently, it was irradiated with ultraviolet light using a conveyor-type ultraviolet irradiation apparatus U-0303 (manufactured by GS Yuasa Corporation, using a high-pressure mercury lamp, lamp output: 80 W/cm, conveyor speed: 3 m/min), wherein the ultraviolet radiation dose was set to 540 mJ/cm$^2$, thereby obtaining a laminated film.

A laminated film having a nylon film as the base material was obtained in a similar manner, except that a stretched nylon film having a thickness of 15 μm (N1102 manufactured by Toyobo Co., Ltd.) was used instead of the stretched polyester film having a thickness of 12 μm (E5101 manufactured by Toyobo Co., Ltd.).

Further, a laminated film having a polypropylene film as the base material was obtained in a similar manner, except that a stretched propylene film having a thickness of 20 μm (P2161 manufactured by Toyobo Co., Ltd.) was used instead of the stretched polyester film having a thickness of 12 μm (E5101 manufactured by Toyobo Co., Ltd.).

Using the prepared laminated films, the gas barrier properties and the laminate strength were measured according to the above-described methods. The results are shown in Table 6.

Example C2

An adhesive solution b was prepared in a manner similar to that in Example C1, except that the resin composition E was used instead of the resin composition A, and the measurements were carried out in manners similar to those in Example C1. The results are shown in Table 6.

Example C3

A solution containing 100.0 parts by mass of the resin composition E, 17.4 parts by mass of an epoxy resin having a glycidylamino group induced from m-xylylenediamine (TETRAD-X manufactured by Mitsubishi Gas Chemical Company, Inc.) and 65.71 parts by mass of methanol was prepared. 0.2 parts by mass of a silicone-based defoamer (BYK065 manufactured by BYK-Chemie) was added thereto, and the mixture was stirred well, thereby preparing an adhesive solution c. The measurements were carried out in manners similar to those in Example C1. The results are shown in Table 6.

Example C4

An adhesive solution d was prepared in a manner similar to that in Example C1, except that the resin composition F was used instead of the resin composition A, and the measurements were carried out in manners similar to those in Example C1. The results are shown in Table 6.

Example C5

An adhesive solution e was prepared in a manner similar to that in Example C1, except that the resin composition G was used instead of the resin composition A, and the measurements were carried out in manners similar to those in Example C1. The results are shown in Table 6.

Example C6

An adhesive solution f was prepared in a manner similar to that in Example C1, except that the resin composition H was used instead of the resin composition A, and the measurements were carried out in manners similar to those in Example C1. The results are shown in Table 6.

Example C7

The adhesive solution a was applied to a stretched polyester film having a thickness of 12 μm (E5101 manufactured by Toyobo Co., Ltd.) using a bar coater No. 8 (the application amount: 5.0 g/m$^2$ (solid content)), and it was dried at 85° C. for 30 seconds. After that, the resin composition A was cured with a conveyor-type ultraviolet irradiation apparatus U-0303 (manufactured by GS Yuasa Corporation, using a high-pressure mercury lamp, lamp output: 80 W/cm, conveyor speed: 3 m/min), wherein the ultraviolet radiation dose was set to 540 mJ/cm$^2$, thereby obtaining a coated film Onto the coat layer obtained by curing of the resin composition A of the obtained coated film, an ethyl acetate solution containing 50 parts by mass of a polyether component (TM-319 manufactured by Toyo-Morton, Ltd.) and 50 parts by mass of a polyisocyanate component (CAT-19B manufactured by Toyo-Morton, Ltd.) (solid content concentration: 30% by mass) was applied using a bar coater No. 8 (the application amount: 3.5 g/m$^2$ (solid content)), and it was dried at 85° C. for 10 seconds. After that, a linear low-density polyethylene film having a thickness of 40 μm (TUX-MCS manufactured by Mitsui Chemicals Tohcello Inc.) was bonded thereto using a nip roll and it was subjected to aging at 40° C. for 2 days, thereby obtaining a laminated film having the base material made of polyester.

A laminated film having a nylon film as the base material was obtained in a similar manner, except that a stretched nylon film having a thickness of 15 μm (N1102 manufactured by Toyobo Co., Ltd.) was used instead of the stretched polyester film having a thickness of 12 μm (E5101 manufactured by Toyobo Co., Ltd.).

Further, a laminated film having a polypropylene film as the base material was obtained in a similar manner, except that a stretched propylene film having a thickness of 20 μm (P2161 manufactured by Toyobo Co., Ltd.) was used instead of the stretched polyester film having a thickness of 12 μm (E5101 manufactured by Toyobo Co., Ltd.).

Using the prepared laminated films, the gas barrier properties and the laminate strength were measured according to the above-described methods. The results are shown in Table 6.

Example C8

A urethane adhesive (TM-319/CAT-19B manufactured by Toyo-Morton, Ltd.) was applied to a polyester film having a thickness of 12 μm (E5100 manufactured by Toyobo Co., Ltd.) using a bar coater No. 8 (the application amount: 3.0 g/m$^2$ (solid content)), and it was dried at 85° C. for 30 seconds. After that, an aluminum foil having a thickness of 7 μm (1N30 manufactured by Mitsubishi Aluminum Co., Ltd.) was bonded thereto using a nip roll. The adhesive solution a was applied to the aluminum foil surface of the base material prepared using a bar coater No. 8 (the application amount: 3.0 g/m² (solid content)), and it was dried at 85° C. for 30 seconds. After that, a linear low-density polyethylene film having a thickness of 40 μm (TUX-MCS manufactured by Mitsui Chemicals Tohcello Inc.) was bonded thereto using a nip roll. Subsequently, the resin composition A was cured with a conveyor-type ultraviolet irradiation apparatus U-0303 (manufactured by GS Yuasa Corporation, using a high-pressure mercury lamp, lamp output: 80 W/cm, conveyor speed: 3 m/min), wherein the ultraviolet radiation dose was set to 540 mJ/cm², thereby obtaining a laminated film.

Using the prepared laminated film, the gas barrier properties and the laminate strength were measured according to the above-described methods. The results are shown in Table 6.

Comparative Example C1

A solution containing 100 parts by weight of UV-7600B (ultraviolet curable urethane acrylate resin manufactured by The Nippon Synthetic Chemical Industry Co., Ltd., containing 4 phr of a photopolymerization initiator) and 100 parts by mass of ethyl acetate was prepared, thereby obtaining an adhesive solution g.

The measurements were carried out in manners similar to those in Example C1, except that the adhesive solution g was used instead of the adhesive solution a. The results are shown in Table 6.

Comparative Example C2

An adhesive solution g was prepared in a manner similar to that in Comparative Example C1, and the measurements were carried out in manners similar to those in Example C7. The results are shown in Table 6.

The gas barrier laminate explained above can exert excellent gas barrier properties and good adhesiveness simultaneously. For this reason, the gas barrier laminate is utilized in a wide range of industrial fields including coating materials for corrosion proof and beautification, packaging materials for foods, pharmaceutical products, etc. for which high gas barrier properties are required, and electronic components. In particular, the gas barrier laminate can be suitably used as a gas barrier laminate containing a film made of a plastic such as polyolefin, polyester and polyamide used for packaging materials for foods, pharmaceutical products, etc.

Fourth Embodiment

Layer Structure of Gas Barrier Laminate

In one embodiment, the gas barrier laminate of the present invention (hereinafter also referred to as "flex-resistant laminate") at least has: a base material layer (F); a silica vapor deposition layer, an alumina vapor deposition layer or a silica/alumina binary vapor deposition layer (V); and a gas barrier layer (G).

[Base Material Layer (F)]

Examples of film materials as the base material include polyester-based films of polyethylene terephthalate, polybutylene terephthalate, etc., polyamide-based films of Nylon 6, Nylon 6,6, poly(m-xylene adipamide) (N-MXD6), etc., biodegradable films of polylactic acid, etc., polyolefin-based films of low-density polyethylene, high-density polyethylene, linear low-density polyethylene, polypropylene, etc., polyacrylonitrile-based films, poly(meth)acrylic films, polystyrene-based films, polycarbonate-based films, ethylene-vinyl alcohol copolymer (EVOH)-based films, polyvinyl alcohol-based films, papers such as carton, and foils of metals such as aluminium and copper. Further, it is also possible to use films obtained by coating these various materials to be used as the base material with any of various polymers such as polyvinylidene chloride (PVDC) resin, polyvinyl alcohol resin, ethylene-vinyl acetate copolymer

TABLE 6

| | Resin composition | Adhesive solution | Use or non-use of urethane adhesive | Oxygen transmission rate of laminate (ml/m² · day · MPa) Base material | | | | Oxygen transmission coefficient of gas barrier layer (ml · mm/m² · day · MPa) | Laminate strength (g/15 mm) Base material | | | |
|---|---|---|---|---|---|---|---|---|---|---|---|---|
| | | | | Poly-ester | Nylon | Poly-propylene | Alumi-nium | | Poly-ester | Nylon | Poly-propylene | Alumi-nium |
| Example C1 | A | a | Not used | 85 | 78 | 93 | — | 0.47 | 700 | 850 | 100 | — |
| Example C2 | E | b | Not used | 122 | 109 | 139 | — | 0.71 | 750 | 850 | 120 | — |
| Example C3 | E | c | Not used | 91 | 84 | 98 | — | 0.51 | 700 | 800 | 150 | — |
| Example C4 | F | d | Not used | 266 | 209 | 358 | — | 1.85 | 800 | 850 | 150 | — |
| Example C5 | G | e | Not used | 260 | 205 | 348 | — | 1.8 | 800 | 750 | 100 | — |
| Example C6 | H | f | Not used | 136 | 119 | 157 | — | 0.8 | 850 | 800 | 130 | — |
| Example C7 | A | a | Used | 85 | 78 | 93 | — | 0.47 | 700 | 800 | 150 | — |
| Example C8 | A | a | Not used | — | — | — | 0.99 | 0.47 | — | — | — | 100 |
| Comparative Example C1 | — | g | Not used | 967 | 489 | >2000 | — | >100 | 500 | 800 | 100 | — |
| Comparative Example C2 | — | g | Used | 962 | 484 | >2000 | — | >100 | 700 | 850 | 130 | — | saponified product-based resin and acrylic resin, films obtained by vapor deposition of a metal such as aluminium on the materials, films obtained by dispersing an inorganic filler or the like in the materials, films to which oxygen trapping function is imparted, etc.

Moreover, it is also possible to disperse an inorganic filler in the various polymers to be used for coating. Examples of the inorganic filler include silica, alumina, mica, talc, aluminum flake and glass flake, but a layered silicate such as montmorillonite is preferred. As a method for dispersing the inorganic filler, conventionally known methods such as an extrusion/kneading method and a method of mixing and dispersion in a resin solution can be used. Examples of methods for imparting oxygen trapping function to the film include a method of at least partially using a composition comprising a low-molecular organic compound which reacts with oxygen such as hindered phenols, vitamin C, vitamin E, organic phosphorus compounds, gallic acid and pyrogallol, a compound of a transition metal such as cobalt, manganese, nickel, iron and copper or the like.

The thickness of the above-described film material is preferably 10 µm to 300 µm, more preferably 10 µm to 100 µm, and particularly preferably 10 µm to 50 µm from a practical viewpoint. Further, the above-described film may be uniaxially or biaxially stretched.

[Vapor Deposition Layer (V)]

The vapor deposition layer (V) is a silica vapor deposition layer, an alumina vapor deposition layer or a silica/alumina binary vapor deposition layer. These vapor deposition layers are formed by vapor deposition of silica and/or alumina on the above-described base material layer. As the vapor deposition method, either the physical vapor deposition method or the chemical vapor deposition method may be employed.

The thickness of the above-described vapor deposition layer is not particularly limited and can be suitably set, but is preferably 0.1 nm to 500 nm, more preferably 0.3 nm to 100 nm, and particularly preferably 0.5 nm to 50 nm from a practical viewpoint. When the thickness is 0.1 nm to 500 nm, the flex resistance of the vapor deposition film tends to be improved.

[Gas Barrier Layer (G)]

The gas barrier layer (G) is formed by curing of the active-energy-ray-curable resin described in the first embodiment above.

[Active-Energy-Ray-Curable Resin and Preparation Method Thereof]

The active-energy-ray-curable resin to be used and the preparation method thereof are as described in the first embodiment above except for matters specifically described below.

The active-energy-ray-curable resin to be used in the present invention preferably comprises a structure having an amide group and an amino group in the molecule. In the present invention, it is not that it is sufficient when the resin to be used for forming the gas barrier layer has any of various (meth)acrylic groups, and it is preferred to have a specific (meth)acrylic group, for example, as shown by general formula (1) in the first embodiment, for providing a gas barrier layer having excellent gas barrier properties, flex resistance and adhesive properties.

When applying the resin composition of the present invention to the vapor deposition layer, in order to support moistening of the surface of each of various base materials, a wetting agent such as silicone and an acrylic compound may be added to the resin composition. Examples of appropriate wetting agents include BYK331, BYK333, BYK340, BYK347, BYK348, BYK378, BYK380 and BYK381 which can be obtained from BYK-Chemie. The amount of the wetting agent to be added is preferably from 0.01 to 2.0% by mass based on the total mass of the resin composition.

Further, in order to improve tackiness for the vapor deposition layer, a tackifier such as xylene resin, terpene resin, phenol resin and rosin resin may be added to the resin composition according to need. The amount of the tackifier to be added is preferably from 0.01 to 2.0% by mass based on the total mass of the resin composition.

In order to improve adhesiveness for the vapor deposition layer, a coupling agent such as a silane coupling agent and a titanium coupling agent may be added to the resin composition. The amount of the coupling agent to be added is preferably from 0.01 to 5.0% by mass based on the total mass of the resin composition.

Moreover, when the active-energy-ray-curable resin is applied to the vapor deposition layer, in order to support disappearance of foam generated at the time of mixing with stirring and application, a defoamer made of a silicone-based or acrylic compound may be added to the resin. Examples of appropriate defoamers include BYK019, BYK052, BYK065, BYK066N, BYK067N, BYK070 and BYK080 which can be obtained from BYK-Chemie, but BYK065 is particularly preferred. The amount of the defoamer to be added is preferably from 0.01 to 3.0% by mass based on the total mass of the resin composition.

In the present invention, a resin layer (R) may further exist between the gas barrier layer (G) and the vapor deposition layer (V). Examples of resins to be used as the resin layer (R) include polyurethane-based resins such as polyurethane resin, polyurethane urea resin, acrylic-modified urethane resin and acrylic-modified urethane urea resin; vinyl chloride-vinyl acetate copolymer-based resins; rosin-based resins such as rosin-modified maleic acid resin; polyamide-based resins; polyester-based resins; chlorinated olefin-based resins such as chlorinated polypropylene resin; polyethyleneimine-based resins; polybutadiene-based resins; and organic titanium-based resins.

The above-described resin layer (R) can be formed by dissolving these resins in a solvent such as water, methanol, ethanol, 2-propanol, ethyl acetate, methyl ethyl ketone and toluene and applying the mixture using the gravure method, the roll coat method or the like. Further, for forming the resin layer (R), general printing apparatuses used for printing on conventional polymer films such as gravure printing machines, flexographic printing machines and offset printing machines can be similarly employed.

When forming the above-described resin layer (R), the thickness thereof is 0.005 to 5 µm, and preferably 0.01 to 3 µm from a practical viewpoint. When the thickness is less than 0.005 µm, it is difficult to obtain sufficient adhesiveness. Meanwhile, when the thickness is more than 5 µm, it is difficult to form a resin layer having a uniform thickness.

When using a curable material as the above-described resin layer (R), either a one-liquid type material or a two-liquid type material may be used. However, when water resistance and heat resistance are desired to be imparted, a two-liquid type material is more preferred from a practical viewpoint.

Moreover, for imparting other functionalities to the above-described resin layer (R), an additive may be contained in the above-described resins. For example, for the purpose of the improvement of abrasion resistance, the prevention of blocking, the improvement of slip properties and heat resistance and the prevention of static charge, a wax, a dispersant, an antistatic agent, a surface modifier, etc. can be added, and these additives can be suitably selected.

[Curing of Active-Energy-Ray-Curable Resin]

The method for curing the active-energy-ray-curable resin with active energy ray is as described in the first embodiment above except for matters specifically described below.

As the style of coating for applying the active-energy-ray-curable resin onto the vapor deposition layer, for example, any of generally-used coating styles such as bar coater coating, Meyer bar coating, air knife coating, gravure coating, reverse gravure coating, micro gravure coating, micro reverse gravure coater coating, die coater coating, slot die coater coating, vacuum die coater coating, dip coating, spin coat coating, spray coating and brush coating may be used. Roll coating or spray coating is preferred.

When the active-energy-ray-curable resin contains a volatile component (typically a solvent), it is desirable to irradiate the resin with the active energy ray after applying the resin to the vapor deposition layer and drying the volatile component. Drying conditions are at 10 to 220° C. for 3 to 20 seconds, preferably at 20 to 180° C. for 3 to 20 seconds, and more preferably at 25 to 150° C. for 3 to 20 seconds.

The oxygen transmission coefficient of the gas barrier layer (G) formed by curing of the above-described active-energy-ray-curable resin is preferably 2.0 ml·mm/m$^2$·day·MPa (23° C., 60% RH) or less. It is more preferably 1.9 or less, and particularly preferably 1.8 or less.

The oxygen transmission coefficient is measured according to the method described in Example D below.

Regarding the adhesiveness between the above-described gas barrier layer (G) and the vapor deposition layer (V), the laminate strength of the laminated film prepared according to the method described in the Examples below is preferably 100 g/15 mm or more from a practical viewpoint. It is more preferably 120 g/15 mm or more, and particularly preferably 150 g/15 mm or more.

Example D

Hereinafter, the above-described fourth embodiment will be specifically described by way of examples. However, the present invention is not limited by these examples.

Analysis of resins obtained was carried out by $^1$H-NMR and GPC. The measurement conditions, etc. are as described below.

<$^1$H-NMR>
Apparatus: Ascend™500 manufactured by BRUKAER
Solvent: CD3OD
Sample concentration: 2.5 mg/mL
Cumulative number: 16
<GPC>
Apparatus: Shodex GPC-2001 manufactured by Showa Denko K.K.
Mobile phase solvent: HFIP containing 2 mM sodium trifluoroacetate (TFA-Na)
Temperature: 40° C.
Flow rate: 1.0 mL/min
Sample concentration: 0.05%
Detector: RI
Injection amount: 100 μL The methods for evaluating performances of the gas barrier laminate in the Examples and Comparative Example are as described below.
<Oxygen transmission rate before flexing treatment (ml/m$^2$·day·MPa)>

The oxygen transmission rate of a coated film prepared by applying the resin solution described below to a base material and curing the resin according to the method described in the Examples and Comparative Example was measured.

The measurement was carried out with an oxygen transmission rate measurement apparatus (OX-TRAN2/21 manufactured by Modern Control) under conditions of 23° C. and 60% RH.
<Oxygen Transmission Coefficient of Gas Barrier Layer (ml·mm/m$^2$·day·MPa)>

The oxygen transmission rates of a coated film, which was prepared by applying the resin solution described below to a base material and curing the resin according to the method described in the Examples and Comparative Example, and the base material itself were measured. The measurement was carried out with an oxygen transmission rate measurement apparatus (OX-TRAN2/21 manufactured by Modern Control) under conditions of 23° C. and 60% RH. The oxygen transmission coefficient of the gas barrier layer was calculated using the following formula:

$$1/R_1 = 1/R_2 + DFT/P$$

In this regard:
$R_1$: oxygen transmission rate of coated film (ml/m$^2$·day·MPa)
$R_2$: oxygen transmission rate of base material (ml/m$^2$·day·MPa)
DFT: thickness of gas barrier layer (mm)
P: oxygen transmission coefficient of gas barrier layer
<Oxygen Transmission Rate after Flexing Treatment (ml/m$^2$·day·MPa)>

The oxygen transmission rate of a coated film subjected to twist at 360° 50 times using a Gelbo flex tester (manufactured by Rigaku Kogyo) was measured by a method similar to the method for measuring the oxygen transmission rate before the flexing treatment.
<Adhesiveness of Gas Barrier Layer>

The adhesiveness between the vapor deposition layer and the gas barrier layer was evaluated using the method specified by JIS K-6854. The laminate strength (g/15 mm) of a laminated film prepared according to the method described in the Examples was measured by the T-type peeling test at a peel rate of 300 mm/min.

Resin compositions A to H used in Examples D1 to D9 below were prepared as described in Example A of the first embodiment above. Hereinafter, regarding the resin compositions A to H, results of $^1$H-NMR analysis and GPC measurement of m-xylylenediamine (MXDA)/methyl acrylate (MA) adducts and resins obtained are shown.
(Resin Composition A)
($^1$H-NMR spectral data of MXDA/MA adduct)
2.3-2.5 ppm (3.5H), 2.8 ppm (3.5H), 3.3 ppm (2H), 3.7 ppm (2H), 4.3 ppm (4H), 7.1-7.3 ppm (8H)
($^1$H-NMR of obtained resin)
2.0 ppm (6.9H), 2.3-2.8 ppm (11.6H), 3.3-3.6 ppm (611), 4.1-4.4 ppm (8.9H), 5.7 ppm (2.3H), 6.1 ppm (2.3H), 7.3-7.6 ppm (8H)
(Results of GPC analysis of MXDA/MA adduct)
Mn: 15,000, Mw: 36,000, Mw/Mn: 2.4
(Results of GPC analysis of obtained resin)
Mn: 17,000, Mw: 59,500, Mw/Mn: 3.5
(Resin Composition B)
($^1$H-NMR spectral data of MXDA/MA adduct)
2.3-2.5 ppm (3.6H), 2.8 ppm (3.6H), 3.3 ppm (2H), 3.7 ppm (2H), 4.3 ppm (411), 7.3-7.6 ppm (811)
($^1$H-NMR spectral data of obtained resin)
2.0 ppm (6.9H), 2.3-2.8 ppm (11.8H), 3.3-3.6 ppm (6H), 4.1-4.4 ppm (8.9H), 5.7 ppm (2.311), 6.1 ppm (2.3H), 7.3-7.6 ppm (811)
(Results of GPC analysis of MXDA/MA adduct)
Mn: 18,000, Mw: 43,000, Mw/Mn: 2.4

(Results of GPC analysis of obtained resin)
Mn: 20,000, Mw: 70,000, Mw/Mn: 3.5
(Resin Composition C)
($^1$H-NMR spectral data of MXDA/MA adduct)
2.3-2.5 ppm (3.7H), 2.8 ppm (3.7H), 3.3 ppm (2H), 3.7 ppm (2H), 4.3 ppm (4H), 7.3-7.6 ppm (8H)
($^1$H-NMR spectral data of obtained resin)
2.0 ppm (6.9H), 2.3-2.8 ppm (12H), 3.3-3.6 ppm (6H), 4.1-4.4 ppm (8.9H), 5.7 ppm (2.3H), 6.1 ppm (2.3H), 7.3-7.6 ppm (8H)
(Results of GPC analysis of MXDA/MA adduct)
Mn: 35,000, Mw: 84,000, Mw/Mn: 2.4
(Results of GPC analysis of obtained resin)
Mn: 36,000, Mw: 86,500, Mw/Mn: 3.5
(Resin Composition D)
($^1$H-NMR spectral data of MXDA/MA adduct)
2.3-2.5 ppm (3.6H), 2.8 ppm (3.6H), 3.3 ppm (2H), 3.7 ppm (2H), 4.3 ppm (4H), 7.3-7.6 ppm (8H)
($^1$H-NMR spectral data of obtained resin)
2.0 ppm (3.4H), 2.3-2.7 ppm (5.9H), 2.8 ppm (3.6H), 3.3 ppm (4H), 3.8 ppm (2H), 4.1-4.4 ppm (5.4H), 5.7 ppm (1.1H), 6.1 ppm (1.1H), 7.3-7.6 ppm (8H)
(Results of GPC analysis of MXDA/MA adduct)
Mn: 18,000, Mw: 43,000, Mw/Mn: 2.4
(Results of GPC analysis of obtained resin)
Mn: 19,000, Mw: 61,000, Mw/Mn: 3.2
(Resin Composition E)
($^1$H-NMR spectral data of MXDA/MA adduct)
2.3-2.5 ppm (3.5H), 2.8 ppm (3.5H), 3.3 ppm (2H), 3.7 ppm (2H), 4.3 ppm (4H), 7.3-7.6 ppm (8H)
($^1$H-NMR spectral data of obtained resin)
2.0 ppm (3.4H), 2.3-2.8 ppm (5.8H), 2.8 ppm (3.5H), 3.3 ppm (4H), 3.8 ppm (2H), 4.1-4.4 ppm (5.4H), 5.7 ppm (1.1H), 6.1 ppm (1.1H), 7.3-7.6 ppm (8H)
(Results of GPC analysis of MXDA/MA adduct)
Mn: 15,000, Mw: 36,000, Mw/Mn: 2.4
(Results of GPC analysis of obtained resin)
Mn: 16,000, Mw: 49,500, Mw/Mn: 3.1
(Resin Composition F)
($^1$H-NMR spectral data of MXDA/MMA adduct)
1.2 ppm (5.3H), 2.3-2.5 ppm (1.8H), 2.6-2.8 ppm (3.5H), 3.3 ppm (2H), 3.8 ppm (2H), 4.4 ppm (4H), 7.3-7.6 ppm (8H)
($^1$H-NMR spectral data of obtained resin)
1.2 ppm (5.3H), 2.0 ppm (6.9H), 2.4-2.7 ppm (6.4H), 2.8-2.9 ppm (3.5H), 3.3 ppm (4H), 3.8 ppm (2H), 4.1-4.4 ppm (8.9H), 5.7 ppm (2.3H), 6.1 ppm (2.3H), 7.3-7.6 ppm (8H)
(Results of GPC analysis of MXDA/MMA adduct)
Mn: 11,000, Mw: 17,500, Mw/Mn: 1.6
(Results of GPC analysis of obtained resin)
Mn: 13,000, Mw: 32,500, Mw/Mn: 2.5
(Resin Composition G)
($^1$H-NMR spectral data of MXDA/MC adduct)
1.1 ppm (5.3H), 2.1-2.4 ppm (3.5H), 3.0 ppm (1.8H), 3.3 ppm (2H), 4.2 ppm (2H), 4.3 ppm (4H), 7.3-7.6 ppm (8H)
($^1$H-NMR spectral data of obtained resin)
1.1 ppm (5.3H), 2.0 ppm (6.9H), 2.1-2.3 ppm (3.5H), 2.4-2.7 ppm (4.6H), 3.0 ppm (1.8H), 3.3 ppm (4H), 3.8 ppm (2H), 4.1-4.4 ppm (8.9H), 5.7 ppm (2.3H), 6.1 ppm (2.3H), 7.3-7.6 ppm (8H)
(Results of GPC analysis of MXDA/MC adduct)
Mn: 11,500, Mw: 18,500, Mw/Mn: 1.6
(Results of GPC analysis of obtained resin)
Mn: 14,000, Mw: 35,000, Mw/Mn: 2.5

(Resin Composition H)
($^1$H-NMR spectral data of MXDA/MA adduct)
2.3-2.5 ppm (2.8H), 2.8 ppm (2.8H), 3.3 ppm (2H), 3.7 ppm (2H), 4.3 ppm (4H), 7.3-7.6 ppm (8H)
($^1$H-NMR spectral data of obtained resin)
2.0 ppm (6H), 2.3-2.5 ppm (2.8H), 2.8 ppm (2.8H), 3.4 ppm (4H), 3.8 ppm (2H), 4.2 ppm (2H), 4.5 ppm (4H), 4.6 ppm (4H), 5.7 ppm (2H), 6.1 ppm (2H), 7.3-7.6 ppm (8H)
(Results of GPC analysis of MXDA/MA adduct)
Mn: 10,000, Mw: 21,100, Mw/Mn: 2.1
(Results of GPC analysis of obtained resin)
Mn: 11,000, Mw: 31,000, Mw/Mn: 2.8

TABLE 7

| Resin composition | Components | | | Reaction molar ratio | |
|---|---|---|---|---|---|
| | (A) | (B) | (C) | (B)/(A) | (C)/[(A) + (B)] |
| A | MXDA | MA | GMA | 0.88 | 0.61 |
| B | MXDA | MA | GMA | 0.90 | 0.61 |
| C | MXDA | MA | GMA | 0.93 | 0.60 |
| D | MXDA | MA | GMA | 0.90 | 0.30 |
| E | MXDA | MA | GMA | 0.88 | 0.30 |
| F | MXDA | MMA | GMA | 0.88 | 0.61 |
| G | MXDA | MC | GMA | 0.88 | 0.61 |
| H | MXDA | MA | IEMA | 0.70 | 0.59 |

MXDA: m-xylylenediamine
MA: methyl acrylate
MMA: methyl methacrylate
MC: methyl crotonate
GMA: glycidyl methacrylate
IEMA: 2-isocyanatoethyl methacrylate Example D1

Preparation of Sample for Measurement of Oxygen Transmission Rate of Coated Film A solution containing 153.8 parts by mass of the resin composition A and 68.42 parts by mass of methanol was prepared. 0.2 parts by mass of a silicone-based defoamer (BYK065 manufactured by BYK-Chemie), 3.0 parts by mass of a silane coupling agent (KBM-503 manufactured by Shin-Etsu Chemical Co., Ltd.) and 2.0 parts by mass of a photopolymerization initiator (Irgacure2959 manufactured by Ciba) were added thereto, and the mixture was stirred well, thereby obtaining a resin solution a.

The resin solution a was applied to the vapor deposition surface of a film obtained by subjecting a polyethylene terephthalate film having a thickness of 12 μm as a base material to silica deposition (TECHBARRIER L manufactured by Mitsubishi Plastics, Inc.) using a bar coater No. 3 (the application amount: 1.0 g/m$^2$ (solid content)), and it was dried at 85° C. for 30 seconds. After that, the resin composition A was cured with a conveyor-type ultraviolet irradiation apparatus U-0303 (manufactured by GS Yuasa Corporation, using a high-pressure mercury lamp, lamp output: 80 W/cm, conveyor speed: 3 m/min), wherein the ultraviolet radiation dose was set to 540 mJ/cm$^2$, thereby obtaining a coated film.

Using the prepared coated film, the oxygen transmission rate before and after the flexing treatment was obtained according to the above-described method. The results are shown in Table 8.

<Preparation of Sample for Measurement of Oxygen Transmission Coefficient of Gas Barrier Layer>

The resin solution a was applied to a polyester film having a thickness of 12 μm as a base material (E5100 manufactured by Toyobo Co., Ltd.) using a bar coater No. 8 (the application amount: 5.0 g/m$^2$ (solid content)), and it was dried at 85° C. for 30 seconds. After that, the resin composition A was cured with a conveyor-type ultraviolet irradiation apparatus U-0303 (manufactured by GS Yuasa Corporation, using a high-pressure mercury lamp, lamp output: 80 W/cm, conveyor speed: 3 m/min), wherein the ultraviolet radiation dose was set to 540 mJ/cm$^2$, thereby obtaining a sample.

Using the prepared coated film, the oxygen transmission coefficient of the coat layer was obtained according to the above-described method. The results are shown in Table 8.

<Preparation of Sample for Measurement of Laminate Strength>

The resin solution a was applied to the vapor deposition surface of a film obtained by subjecting a polyethylene terephthalate film having a thickness of 12 μm as a base material to silica deposition (TECHBARRIER L manufactured by Mitsubishi Plastics, Inc.) using a bar coater No. 3 (the application amount: 1.0 g/m$^2$ (solid content)), and it was dried at 85° C. for 30 seconds. After that, the resin composition A was cured with a conveyor-type ultraviolet irradiation apparatus U-0303 (manufactured by GS Yuasa Corporation, using a high-pressure mercury lamp, lamp output: 80 W/cm, conveyor speed: 3 m/min), wherein the ultraviolet radiation dose was set to 540 mJ/cm$^2$, thereby preparing a coated film. Subsequently, to the surface of the gas barrier layer containing the resin composition A, as a polyurethane-based adhesive, an ethyl acetate solution containing 50 parts by mass of a polyether component (TM-319 manufactured by Toyo-Morton, Ltd.) and 50 parts by mass of a polyisocyanate component (CAT-19B manufactured by Toyo-Morton, Ltd.) (solid content concentration: 30% by mass) was applied (the application amount: 3.5 g/m$^2$ (solid content)), and it was dried at 85° C. for 10 seconds. After that, a linear low-density polyethylene film having a thickness of 40 μm (TUX-MCS manufactured by Mitsui Chemicals Tohcello Inc.) was bonded thereto using a nip roll and it was subjected to aging at 40° C. for 2 days, thereby obtaining a laminated film.

The laminate strength of the laminated film was measured according to the above-described method to evaluate the adhesiveness between the vapor deposition layer and the gas barrier layer. The results are shown in Table 8.

Example D2

A resin solution b was prepared in a manner similar to that in Example D1, except that the resin composition B was used instead of the resin composition A, and the measurements were carried out in manners similar to those in Example D1. The results are shown in Table 8.

Example D3

A resin solution c was prepared in a manner similar to that in Example D1, except that the resin composition C was used instead of the resin composition A, and the measurements were carried out in manners similar to those in Example D1. The results are shown in Table 8.

Example D4

A resin solution d was prepared in a manner similar to that in Example D1, except that the resin composition D was used instead of the resin composition A, and the measurements were carried out in manners similar to those in Example D1. The results are shown in Table 8.

Example D5

A resin solution e was prepared in a manner similar to that in Example D1, except that the resin composition E was used instead of the resin composition A, and the measurements were carried out in manners similar to those in Example D1. The results are shown in Table 8.

Example D6

A solution containing 100.0 parts by mass of the resin composition E, 17.4 parts by mass of an epoxy resin having a glycidylamino group induced from m-xylylenediamine (TETRAD-X manufactured by Mitsubishi Gas Chemical Company, Inc.) and 65.71 parts by mass of methanol was prepared. 0.2 parts by mass of a silicone-based defoamer (BYK065 manufactured by BYK-Chemie), 3.0 parts by mass of a silane coupling agent (KBM-503 manufactured by Shin-Etsu Chemical Co., Ltd.) and 2 parts by mass of a photopolymerization initiator (Irgacure2959 manufactured by Ciba) were added thereto, and the mixture was stirred well, thereby obtaining a resin solution f.

The measurements were carried out in manners similar to those in Example D1, except that the above-described resin solution f was used instead of the resin solution a. The results are shown in Table 8.

Example D7

A resin solution g was prepared in a manner similar to that in Example D1, except that the resin composition F was used instead of the resin composition A, and the measurements were carried out in manners similar to those in Example D1. The results are shown in Table 8.

Example D8

A resin solution h was prepared in a manner similar to that in Example D1, except that the resin composition G was used instead of the resin composition A, and the measurements were carried out in manners similar to those in Example D1. The results are shown in Table 8.

Example D9

A resin solution i was prepared in a manner similar to that in Example D1, except that the resin composition H was used instead of the resin composition A, and the measurements were carried out in manners similar to those in Example D1. The results are shown in Table 8.

Comparative Example D1

A solution containing 100 parts by weight of UV-7600B (ultraviolet curable urethane acrylate resin manufactured by The Nippon Synthetic Chemical Industry Co., Ltd., containing 4 phr of a photopolymerization initiator) and 100 parts by mass of ethyl acetate was prepared, thereby obtaining a resin solution j.

The measurements were carried out in manners similar to those in Example D1, except that the resin solution j was used instead of the resin solution a. The results are shown in Table 8.

TABLE 8

|  | Oxygen transmission coefficient of gas barrier layer (ml · mm/m² · day · MPa) | Oxygen transmission rate of coated film before flexing treatment (ml/m² · day · MPa) | Oxygen transmission rate of coated film after flexing treatment (ml/m² · day · MPa) | Laminate strength (g/15 mm) |
|---|---|---|---|---|
| Example D1 | 0.47 | 1.0 | 18 | 150 |
| Example D2 | 0.54 | 1.3 | 20 | 150 |
| Example D3 | 0.63 | 1.5 | 25 | 150 |
| Example D4 | 1.05 | 1.2 | 21 | 180 |
| Example D5 | 0.71 | 1.1 | 20 | 170 |
| Example D6 | 0.51 | 1.6 | 30 | 180 |
| Example D7 | 1.85 | 2.0 | 34 | 200 |
| Example D8 | 1.80 | 1.9 | 35 | 210 |
| Example D9 | 0.80 | 3.0 | 45 | 250 |
| Comparative Example D1 | >100 | 5.0 | 120 | 300 |

The flex-resistant laminate explained above is a laminate obtained by using the active-energy-ray-curable resin having excellent transparency and workability, wherein the heat treatment at a high temperature is not required. Good adhesiveness and excellent gas barrier properties and flex resistance are exerted by the flex-resistant laminate of the present invention by means of curing of the resin. For this reason, flex resistance can be imparted to a vapor deposition film by coating of the vapor deposition layer side of the vapor deposition film. Accordingly, the flex-resistant laminate can be suitably used for applications such as packaging materials for foods, pharmaceutical products, etc., for which high gas barrier properties and flex resistance are required, and electronic components.

Fifth Embodiment

Gas Barrier Laminate

In one embodiment, the gas barrier laminate of the present invention (hereinafter sometimes referred to as "flex-resistant laminate" or "laminated film") at least comprises: a base material layer (F); a silica vapor deposition layer, an alumina vapor deposition layer or a silica/alumina binary vapor deposition layer (V); a gas barrier layer (G) (hereinafter also referred to as "adhesive layer"); and a sealant layer (S). The adhesive layer (G) is formed by curing of the resin described in the first embodiment above.

[Layer Structure of Laminate]

In one embodiment, the gas barrier laminate is obtained by at least laminating: a base material layer (F); a silica vapor deposition layer, an alumina vapor deposition layer or a silica/alumina binary vapor deposition layer (V); an adhesive layer (G); and a sealant layer (S). When a bag is produced using the obtained laminated film, the base material layer is used for the outer surface of the bag and the sealant layer is used for the inner surface of the bag.

[Base Material Layer (F)]

As the base material, materials similar to those described in the fourth embodiment above can be used.

In the present invention, as a layer other than the base material layer (F); the silica vapor deposition layer, the alumina vapor deposition layer or the silica/alumina binary vapor deposition layer (V); the adhesive layer (G); and the sealant layer (S) described above, a film material such as polyolefin and polyester may be laminated (for example, between the adhesive layer and the sealant layer). In this case, the film material to be further used may be a material onto which silica or alumina is deposited. When various materials are laminated, a plurality of adhesive layers may be used. When using a plurality of adhesive layers, an adhesive layer which contacts with the vapor deposition layer is required to be formed by using the adhesive of the present invention. An adhesive layer which does not contact with the vapor deposition layer is not limited as long as it is formed by using an adhesive which exerts laminate strength sufficient as a laminated film. Therefore, an adhesive other than the adhesive of the present invention (e.g., a polyurethane-based adhesive) may be used in combination.

[Vapor Deposition Layer (V)]

As the vapor deposition layer, materials similar to those described in the fourth embodiment above can be used.

[Sealant Layer (S)]

As the sealant layer, a flexible polymer film is preferably used. In consideration of exertion of good heat-seal properties, it is preferred to select a polyolefin-based film such as a polyethylene film, polypropylene film and ethylene-vinyl acetate copolymer. The thickness of the film is about 10 to 300 μm, and preferably about 10 to 100 μm from a practical viewpoint. The surface of the film may be subjected to various surface treatments such as the flame treatment and the corona discharge treatment.

[Adhesive Layer (G)]

The adhesive layer (G) is formed by curing of the active-energy-ray-curable resin described in the first embodiment above.

[Active-Energy-Ray-Curable Resin and Preparation Method Thereof]

The active-energy-ray-curable resin to be used and the preparation method thereof are as described in the fourth embodiment above except for matters specifically described below.

The active-energy-ray-curable resin to be used in the present invention preferably comprises a structure having an amide group and an amino group in the molecule. In the present invention, it is not sufficient when the resin to be used for forming the adhesive layer has any of various (meth)acrylic groups, and it is preferred to have a specific (meth)acrylic group, for example, as shown by general formula (1) in the first embodiment, for providing an adhesive layer having excellent gas barrier properties, flex resistance and adhesive properties.

In the present invention, a resin layer (R) may further exist between the adhesive layer (G) and the vapor deposition layer (V). Examples of resins to be used as the resin layer (R) include polyurethane-based resins such as polyurethane resin, polyurethane urea resin, acrylic-modified urethane resin and acrylic-modified urethane urea resin;

vinyl chloride-vinyl acetate copolymer-based resins; rosin-based resins such as rosin-modified maleic acid resin; polyamide-based resins; polyester-based resins; chlorinated olefin-based resins such as chlorinated polypropylene resin; polyethyleneimine-based resins; polybutadiene-based resins; and organic titanium-based resins.

[Curing of Active-Energy-Ray-Curable Resin]

The method for curing the active-energy-ray-curable resin to be used in the present invention with active energy ray is similar to that in the fourth embodiment above except for matters specifically described below.

The oxygen transmission coefficient of the adhesive layer (G) formed by curing of the active-energy-ray-curable resin is preferably 2.0 ml·mm/m²·day·MPa (23° C., 60% RH) or less. It is more preferably 1.9 or less, and particularly preferably 1.8 or less.

In the present invention, the measurement of the oxygen transmission coefficient is carried out according to the method described in Example E below.

Regarding the adhesiveness between the adhesive layer (G) and the vapor deposition layer (V), the laminate strength of the laminated film prepared according to the method described in Example E below is preferably 100 g/15 mm or more from a practical viewpoint. It is more preferably 120 g/15 mm or more, and particularly preferably 150 g/15 mm or more.

[Production of Laminate]

The laminate can be produced according to a method similar to that described in the third embodiment above.

[Multilayer Packaging Material]

The laminated film produced by using the above-described application liquid (adhesive solution) can be used as a multilayer packaging material for protecting foods, pharmaceutical products, etc. Details thereof are as explained in the third embodiment above.

[Bag for Packaging]

The bag for packaging including a soft bag for packaging, etc. produced by using the multilayer packaging material is as explained in the third embodiment above.

Example E

Hereinafter, the above-described fifth embodiment will be specifically described by way of examples. However, the present invention is not limited by these examples.

Analysis of resins obtained was carried out by $^1$H-NMR and GPC in manners similar to those in the fourth embodiment above.

The methods for evaluating performances of the laminate in the Examples and Comparative Example are as described below.

<Oxygen Transmission Rate Before Flexing Treatment (ml/m²·day·MPa)>

The oxygen transmission rate of a laminate prepared by applying the resin solution described below to a base material and curing the resin according to the method described in the Examples and Comparative Example was measured. The measurement was carried out with an oxygen transmission rate measurement apparatus (OX-TRAN2/21 manufactured by Modern Control) under conditions of 23° C. and 60% RH.

<Oxygen Transmission Coefficient of Adhesive Layer (ml·Mm/m²·day·MPa)>

The oxygen transmission rates of a laminate, which was prepared by applying the resin solution described below to a base material and curing the resin according to the method described in the Examples and Comparative Example, the base material and a sealant layer were measured. The measurement was carried out with an oxygen transmission rate measurement apparatus (OX-TRAN2/21 manufactured by Modern Control) under conditions of 23° C. and 60% RH. The oxygen transmission coefficient of the adhesive layer was calculated using the following formula:

$$1/R_1 = 1/R_2 + DFT/P + 1/R_3$$

In this regard:

$R_1$: oxygen transmission rate of laminate (laminated film) (ml/m²·day·MPa)

$R_2$: oxygen transmission rate of base material (ml/m²·day·MPa)

$R_3$: oxygen transmission rate of sealant layer (ml/m²·day·MPa)

DFT: thickness of adhesive layer (mm)

P: oxygen transmission coefficient of adhesive layer

<Oxygen Transmission Rate after Flexing Treatment (ml/m²·day·MPa)>

The oxygen transmission rate of a laminate subjected to twist at 360° 50 times using a Gelbo flex tester (manufactured by Rigaku Kogyo) was measured by a method similar to the method for measuring the oxygen transmission rate before the flexing treatment.

<Laminate Strength>

The laminate strength (g/15 mm) of a laminated film prepared according to the method described in the Examples was measured by the T-type peeling test. The measurement was carried out at a peel rate of 300 mm/min using the method specified by JIS K-6854.

Resin compositions A to H used in Examples E1 to E9 below were prepared as described in Example A of the first embodiment above. Results of $^1$H-NMR analysis and GPC measurement of m-xylylenediamine (MXDA)/methyl acrylate (MA) adducts and resins obtained are as shown in Example D of the fourth embodiment above.

TABLE 9

| Resin composition | Components | | | Reaction molar ratio | |
| --- | --- | --- | --- | --- | --- |
| | (A) | (B) | (C) | (B)/(A) | (C)/[(A) + (B)] |
| A | MXDA | MA | GMA | 0.88 | 0.61 |
| B | MXDA | MA | GMA | 0.90 | 0.61 |
| C | MXDA | MA | GMA | 0.93 | 0.60 |
| D | MXDA | MA | GMA | 0.90 | 0.30 |
| E | MXDA | MA | GMA | 0.88 | 0.30 |
| F | MXDA | MMA | GMA | 0.88 | 0.61 |
| G | MXDA | MC | GMA | 0.88 | 0.61 |
| H | MXDA | MA | IEMA | 0.70 | 0.59 |

MXDA: m-xylylenediamine
MA: methyl acrylate
MMA: methyl methacrylate
MC: methyl crotonate
GMA: glycidyl methacrylate
IEMA: 2-isocyanatoethyl methacrylate Example E1

Preparation of Sample for Measurement of Laminate Strength and Oxygen Transmission Rate of Laminate A solution containing 153.8 parts by mass of the resin composition A and 68.42 parts by mass of methanol was prepared. 0.2 parts by mass of a silicone-based defoamer (BYK065 manufactured by BYK-Chemie), 3.0 parts by mass of a silane coupling agent (KBM-503 manufactured by Shin-Etsu Chemical Co., Ltd.) and 2.0 parts by mass of a photopolymerization initiator (Irgacure2959 manufactured by Ciba) were added thereto, and the mixture was stirred well, thereby obtaining a resin solution a.

The resin solution a was applied to the vapor deposition surface of a film obtained by subjecting a polyethylene terephthalate film having a thickness of 12 μm as a base material to silica deposition (TECHBARRIER L manufactured by Mitsubishi Plastics, Inc.) using a bar coater No. 8 (the application amount: 5.0 g/m$^2$ (solid content)), and it was dried at 85° C. for 30 seconds. After that, a linear low-density polyethylene film having a thickness of 40 μm (TUX-MCS manufactured by Mitsui Chemicals Tohcello Inc.) was bonded thereto using a nip roll. Subsequently, the resin composition A was cured with a conveyor-type ultraviolet irradiation apparatus U-0303 (manufactured by GS Yuasa Corporation, using a high-pressure mercury lamp, lamp output: 80 W/cm, conveyor speed: 3 m/min), wherein the ultraviolet radiation dose was set to 540 mJ/cm$^2$, thereby obtaining a laminate.

Using the prepared laminate, the laminate strength and the oxygen transmission rate before and after the flexing treatment were obtained according to the above-described methods. The results are shown in Table 10.

<Preparation of Sample for Measurement of Oxygen Transmission Coefficient of Adhesive Layer>

The resin solution a was applied to a polyester film having a thickness of 12 μm as a base material (E5100 manufactured by Toyobo Co., Ltd.) using a bar coater No. 8 (the application amount: 5.0 g/m$^2$ (solid content)), and it was dried at 85° C. for 30 seconds. After that, a linear low-density polyethylene film having a thickness of 40 μm (TUX-MCS manufactured by Mitsui Chemicals Tohcello Inc.) was bonded thereto using a nip roll. Subsequently, the resin composition A was cured with a conveyor-type ultraviolet irradiation apparatus U-0303 (manufactured by GS Yuasa Corporation, using a high-pressure mercury lamp, lamp output: 80 W/cm, conveyor speed: 3 m/min), wherein the ultraviolet radiation dose was set to 540 mJ/cm$^2$, thereby obtaining a laminate.

Using the prepared laminate, the oxygen transmission coefficient of the adhesive layer was obtained according to the above-described method. The results are shown in Table 10.

Example E2

A resin solution b was prepared in a manner similar to that in Example E1, except that the resin composition B was used instead of the resin composition A, and the measurements were carried out in manners similar to those in Example E1. The results are shown in Table 10.

Example E3

A resin solution c was prepared in a manner similar to that in Example E1, except that the resin composition C was used instead of the resin composition A, and the measurements were carried out in manners similar to those in Example E1. The results are shown in Table 10.

Example E4

A resin solution d was prepared in a manner similar to that in Example E1, except that the resin composition D was used instead of the resin composition A, and the measurements were carried out in manners similar to those in Example E1. The results are shown in Table 10.

Example E5

A resin solution e was prepared in a manner similar to that in Example E1, except that the resin composition E was used instead of the resin composition A, and the measurements were carried out in manners similar to those in Example E1. The results are shown in Table 10.

Example E6

A solution containing 100.0 parts by mass of the resin composition E, 17.4 parts by mass of an epoxy resin having a glycidylamino group induced from m-xylylenediamine (TETRAD-X manufactured by Mitsubishi Gas Chemical Company, Inc.) and 65.71 parts by mass of methanol was prepared. 0.2 parts by mass of a silicone-based defoamer (BYK065 manufactured by BYK-Chemie), 3.0 parts by mass of a silane coupling agent (KBM-503 manufactured by Shin-Etsu Chemical Co., Ltd.) and 2 parts by mass of a photopolymerization initiator (Irgacure2959 manufactured by Ciba) were added thereto, and the mixture was stirred well, thereby obtaining a resin solution f.

The measurements were carried out in manners similar to those in Example E1, except that the above-described resin solution f was used instead of the resin solution a. The results are shown in Table 10.

Example E7

A resin solution g was prepared in a manner similar to that in Example E1, except that the resin composition F was used instead of the resin composition A, and the measurements were carried out in manners similar to those in Example E1. The results are shown in Table 10.

Example E8

A resin solution h was prepared in a manner similar to that in Example E1, except that the resin composition G was used instead of the resin composition A, and the measurements were carried out in manners similar to those in Example E1. The results are shown in Table 10.

Example E9

A resin solution i was prepared in a manner similar to that in Example E1, except that the resin composition H was used instead of the resin composition A, and the measurements were carried out in manners similar to those in Example E1. The results are shown in Table 10.

Comparative Example E1

A solution containing 100 parts by weight of UV-7600B (ultraviolet curable urethane acrylate resin manufactured by The Nippon Synthetic Chemical Industry Co., Ltd., containing 4 phr of a photopolymerization initiator) and 100 parts by mass of ethyl acetate was prepared, thereby obtaining a resin solution j.

The measurements were carried out in manners similar to those in Example E1, except that the resin solution j was used instead of the resin solution a. The results are shown in Table 10.

TABLE 10

|  | Oxygen transmission coefficient of adhesive layer (ml · mm/m² · day · MPa) | Oxygen transmission rate of laminate before flexing treatment (ml/m² · day · MPa) | Oxygen transmission rate of laminate after flexing treatment (ml/m² · day · MPa) | Laminate strength (g/15 mm) |
|---|---|---|---|---|
| Example E1 | 0.47 | 0.9 | 15 | 150 |
| Example E2 | 0.54 | 1.2 | 18 | 150 |
| Example E3 | 0.63 | 1.3 | 22 | 150 |
| Example E4 | 1.05 | 1.1 | 19 | 180 |
| Example E5 | 0.71 | 1.0 | 17 | 170 |
| Example E6 | 0.51 | 1.4 | 25 | 180 |
| Example E7 | 1.85 | 1.8 | 29 | 200 |
| Example E8 | 1.80 | 1.7 | 30 | 210 |
| Example E9 | 0.80 | 2.5 | 37 | 250 |
| Comparative Example E1 | >100 | 4.5 | 115 | 300 |

The flex-resistant laminate (flex-resistant laminated film) explained above is a film obtained by using the active-energy-ray-curable resin having excellent transparency and workability, wherein the heat treatment at a high temperature is not required. Good adhesiveness and excellent gas barrier properties and flex resistance are exerted by the flex-resistant laminate explained above by means of curing of the resin. For this reason, flex resistance can be imparted to a vapor deposition film by preparing a laminate using the resin explained above as an adhesive on the vapor deposition layer of the vapor deposition film. Accordingly, the flex-resistant laminate can be suitably used for applications such as packaging materials for foods, pharmaceutical products, etc., for which high gas barrier properties and flex resistance are required, and electronic components.

The invention claimed is:

1. A resin having a structure represented by general formula (1) below:

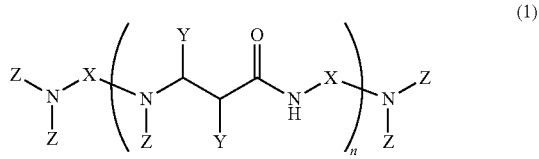

(1)

[in formula (1),

X represents an aliphatic hydrocarbon group having 2 to 8 carbon atoms or a hydrocarbon group having a $C_{6-8}$ aromatic ring;

Ys each independently represent a hydrogen atom, an alkyl group having 1 to 8 carbon atoms, an aralkyl group having 1 to 8 carbon atoms or an aryl group;

Zs each independently represent a hydrogen atom, a (meth)acryloxyalkyl group which may have a hydroxyl group, or a (meth)acryloxyalkylamidoyl group provided that the case where all the Zs are a hydrogen atom is excluded; and n represents an integer of 1 to 1000].

2. The resin according to claim 1, wherein X is a hydrocarbon group having a $C_{6-8}$ aromatic ring.

3. The resin according to claim 1, wherein Ys each independently represent a hydrogen atom, an alkyl group having 1 to 3 carbon atoms, an aralkyl group having 1 to 8 carbon atoms or an aryl group.

4. A resin having a structure represented by general formula (a) below:

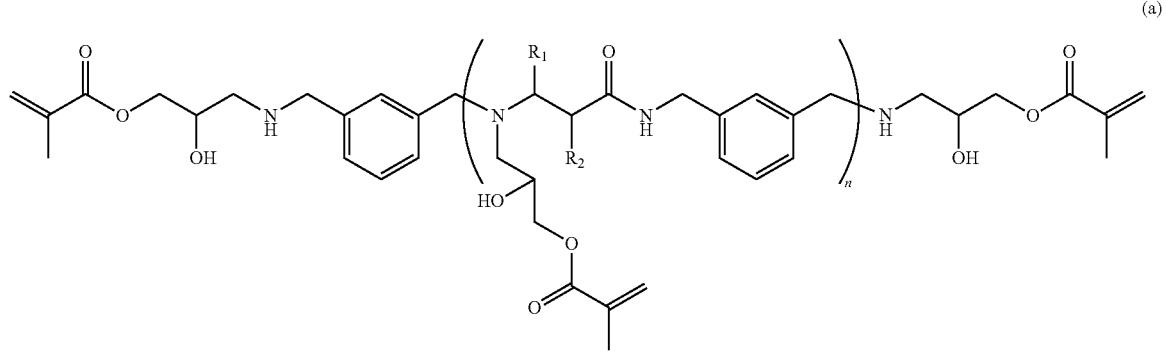

(a)

[in formula (a),

R$_1$ and R$_2$ each independently represent a hydrogen atom or a methyl group; and n represents an integer of 1 to 1000].

5. A resin composition containing the resin according to claim 4.

6. A cured product obtained by curing the resin composition according to claim 5.

7. A coating material containing the resin according to claim 1.

8. An adhesive containing the resin according to claim 1.

9. A gas barrier laminate comprising a base material layer and at least one gas barrier layer, wherein the gas barrier layer comprises a cured product of the resin according to claim 1.

10. The gas barrier laminate according to claim 9, wherein the base material layer is at least one selected from the group consisting of a flexible polymer film layer, a paper layer and a metal foil layer.

11. The gas barrier laminate according to claim 10, wherein the gas barrier layer is arranged on at least one laminate surface of the gas barrier laminate.

12. The gas barrier laminate according to claim 10, which has two or more base material layers, wherein the gas barrier layer is arranged between any two of the base material layers.

13. The gas barrier laminate according to claim 10, wherein the flexible polymer film layer is a polyolefin-based film, a polyester-based film or a polyamide-based film.

14. The gas barrier laminate according to claim 10, wherein the metal foil layer is an aluminum foil.

15. The gas barrier laminate according to claim 9, further comprising a silica vapor deposition layer, an alumina vapor deposition layer or a silica/alumina binary vapor deposition layer.

16. The gas barrier laminate according to claim 15, further comprising a sealant layer.

17. A multilayer packaging material comprising the gas barrier laminate according to claim 16.

18. A bag for packaging obtained by producing the bag using the multilayer packaging material according to claim 17.

19. A resin composition containing the resin according to claim 1.

20. A cured product obtained by curing the resin composition according to claim 19.

* * * * *